United States Patent
Nishimura et al.

(10) Patent No.: US 10,494,480 B2
(45) Date of Patent: Dec. 3, 2019

(54) PHOTOCURABLE FILM-FORMING COMPOSITION AND MANUFACTURING METHOD FOR CURED FILM

(75) Inventors: Naoya Nishimura, Funabashi (JP); Masaaki Ozawa, Funabashi (JP)

(73) Assignee: NISSAN CHEMICAL INDUSTRIES, LTD., Tokyo (JP)

(*) Notice: Subject to any disclaimer, the term of this patent is extended or adjusted under 35 U.S.C. 154(b) by 414 days.

(21) Appl. No.: 13/985,541

(22) PCT Filed: Feb. 15, 2012

(86) PCT No.: PCT/JP2012/053450
§ 371 (c)(1),
(2), (4) Date: Aug. 14, 2013

(87) PCT Pub. No.: WO2012/111682
PCT Pub. Date: Aug. 23, 2012

(65) Prior Publication Data
US 2013/0324634 A1 Dec. 5, 2013

(30) Foreign Application Priority Data

Feb. 15, 2011 (JP) .................................. 2011-029678
Jan. 19, 2012 (JP) .................................. 2012-008552

(51) Int. Cl.
*C08G 73/06* (2006.01)
*C08F 226/02* (2006.01)
(Continued)

(52) U.S. Cl.
CPC ........ *C08G 73/0644* (2013.01); *C08F 226/02* (2013.01); *C08G 59/5086* (2013.01);
(Continued)

(58) Field of Classification Search
CPC ....... C08G 73/00; C08G 73/0644; C08F 2/48; H01L 31/0232; C07D 401/12; C07D 403/00; C08K 5/3492
See application file for complete search history.

(56) References Cited

U.S. PATENT DOCUMENTS 5,886,130 A 3/1999 Trimmer et al.
2006/0178457 A1* 8/2006 Sasaki .................... C08K 5/378
524/100
(Continued)

FOREIGN PATENT DOCUMENTS

JP 07-113009 A 5/1995
JP 2000-053659 A 2/2000
(Continued)

OTHER PUBLICATIONS

International Search Report, issued in PCT/JP2012/053450, dated May 15, 2012.
(Continued)

*Primary Examiner* — Jessica M Roswell
(74) *Attorney, Agent, or Firm* — Birch, Stewart, Kolasch & Birch, LLP

(57) ABSTRACT

A composition comprising both a polymer which contains triazine-ring-containing repeating units represented by formula (17) and a crosslinking agent which consists of either a poly-functional epoxy compound or a polyfunctional (meth)acrylic compound can be photo-cured even without the addition of an initiator to yield a cured film having a high refractive index and high heat resistance. Thus, a photocurable film-forming composition that comprises a triazine-ring-containing polymer, which can achieve, even without the addition of a metal oxide by the polymer alone, high heat resistance, high transparency, a high refractive index, high solubility and low volume shrinkage, and that is curable even without the addition of an acid generator can be provided.

(17)

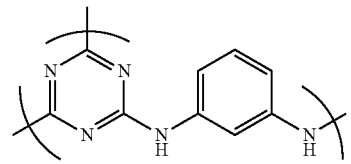

7 Claims, 2 Drawing Sheets

Figure 1:
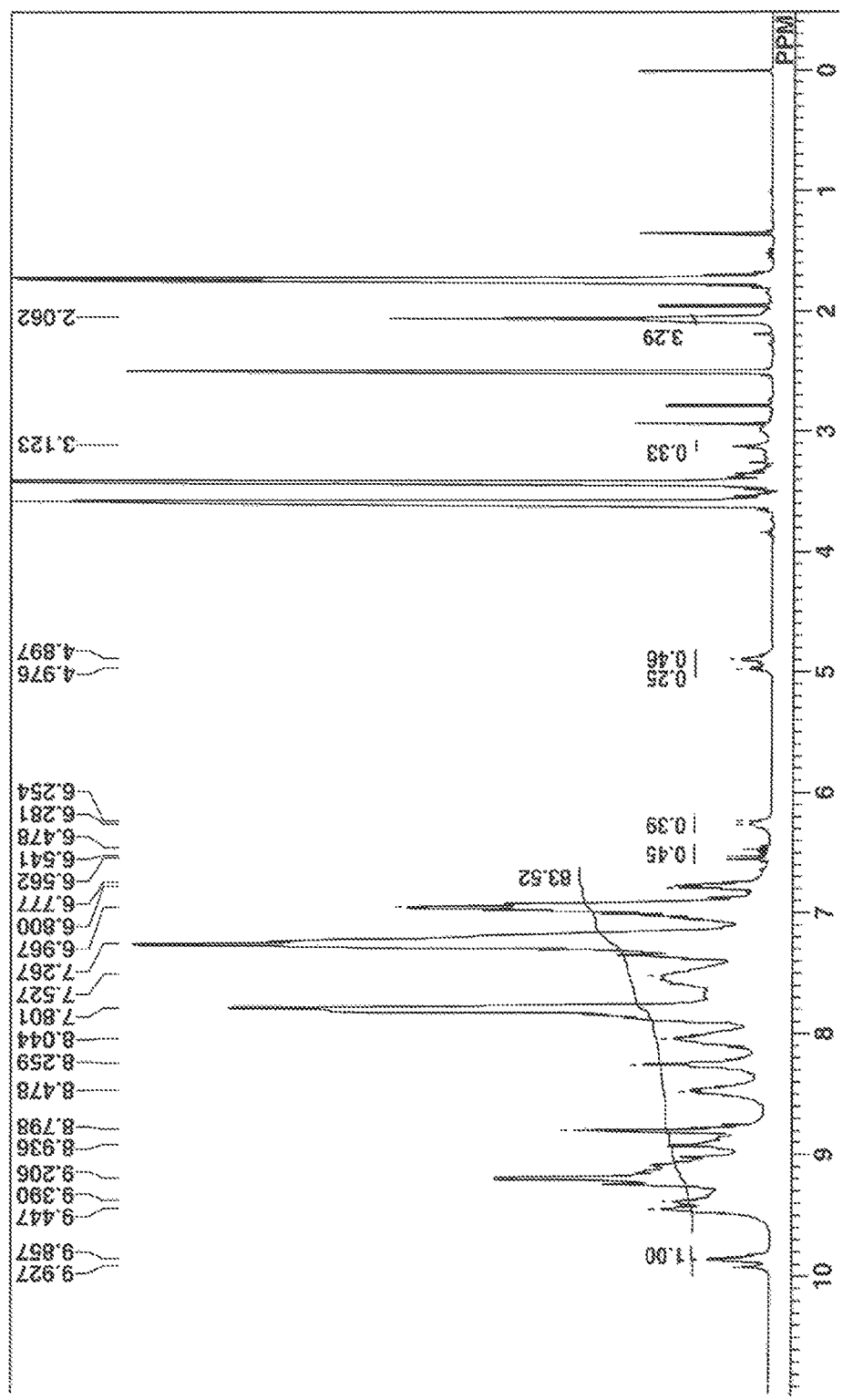

(51) Int. Cl.
 *C08G 73/02* (2006.01)
 *C08L 79/04* (2006.01)
 *C08G 59/50* (2006.01)
 *C08G 59/56* (2006.01)
 *C08G 59/42* (2006.01)
 *C08L 63/00* (2006.01)

(52) U.S. Cl.
 CPC ......... *C08G 59/56* (2013.01); *C08G 73/0273* (2013.01); *C08L 79/04* (2013.01); *C08G 59/42* (2013.01); *C08L 63/00* (2013.01)

(56) References Cited

U.S. PATENT DOCUMENTS

| | | |
|---|---|---|
| 2009/0318725 A1 | 12/2009 | Takeuchi |
| 2010/0003501 A1* | 1/2010 | Liu .................. B82Y 20/00 428/327 |
| 2012/0049308 A1 | 3/2012 | Nishimura et al. |

FOREIGN PATENT DOCUMENTS

| | | |
|---|---|---|
| JP | 2001-503077 A | 3/2001 |
| JP | 2001-167885 A | 6/2001 |
| JP | 2004-156001 A | 6/2004 |
| JP | 2007-246877 A | 9/2007 |
| JP | 2008-024832 A | 2/2008 |
| JP | 2009-271445 A | 11/2009 |
| WO | WO 2010/128661 A1 | 11/2010 |

OTHER PUBLICATIONS

Mahapatra et al., "Hyperbranched Aromatic Polyamines with s-Triazine Rings", Journal of Applied Polymer Science, vol. 106, pp. 95-102 (2007).

PCT/ISA/237—dated May 15, 2012, issued in PCT/JP2012/053450.

* cited by examiner

# PHOTOCURABLE FILM-FORMING COMPOSITION AND MANUFACTURING METHOD FOR CURED FILM

TECHNICAL FIELD

The present invention relates to a photocurable film-forming composition and a method of manufacturing a cured film. More specifically, the invention relates to a photocurable film-forming composition which can be cured without the addition of an acid generator.

BACKGROUND ART

Various efforts have hitherto been made to increase the functionality of polymeric compounds. For example, in one approach currently used to increase the refractive index of polymeric compounds, aromatic rings, halogen atoms or sulfur atoms are introduced onto the compounds. Of such compounds, episulfide polymeric compounds and thiourethane polymeric compounds, both of which have sulfur atoms introduced thereon, are in practical use today as high-refractive index lenses for eyeglasses.

The most effective way to achieve even higher refractive indices in polymeric compounds is known to involve the use of inorganic metal oxides.

For example, a method for increasing the refractive index by using a hybrid material composed of a siloxane polymer mixed with a material containing small dispersed particles of zirconia, titania or the like has been disclosed (Patent Document 1).

A method in which a condensed ring skeleton having a high refractive index is introduced onto portions of a siloxane polymer has also been disclosed (Patent Document 2).

In addition, numerous attempts have been made to impart heat resistance to polymeric compounds. Specifically, it is well known that the heat resistance of polymeric compounds can be improved by introducing aromatic rings. For example, polyarylene copolymers with substituted arylene recurring units on the backbone have been disclosed (Patent Document 3). Such polymeric compounds show promise primarily in use as heat-resistant plastics.

Melamine resins are familiar as triazine resins, but have a very low decomposition temperature compared with heat-resistant materials such as graphite.

The heat-resistant organic materials composed of carbon and nitrogen that have been in use up until now are for the most part aromatic polyimides and aromatic polyamides. However, because these materials have straight-chain structures, their heat-resistance temperatures are not all that high.

Triazine-based condensation materials have also been reported as nitrogen-containing polymeric materials having heat resistance (Patent Document 4).

In recent years, there has arisen a need for high-performance polymeric materials in the development of electronic devices such as liquid-crystal displays, organic electroluminescent (EL) displays, optical semiconductor (LED) devices, solid-state image sensors, organic thin-film solar cells, dye-sensitized solar cells and organic thin-film transistors (TFT).

The specific properties desired in such polymeric materials include (1) heat resistance, (2) transparency, (3) high refractive index, (4) high solubility, and (5) low volume shrinkage.

PRIOR ART DOCUMENTS

Patent Documents

Patent Document 1: JP-A 2007-246877
Patent Document 2: JP-A 2008-24832
Patent Document 3: U.S. Pat. No. 5,886,130
Patent Document 4: JP-A 2000-53659
Patent Document 5: WO 2010/128661

Non-Patent Documents

Non-Patent Document 1: *Journal of Applied Polymer Science*, 106, 95-102 (2007)

SUMMARY OF THE INVENTION

Problems to be Solved by the Invention

It is therefore an object of the present invention to provide a photocurable film-forming composition which includes a triazine ring-containing polymer that is able by itself, without the addition of a metal oxide, to achieve a high heat resistance, high transparency, high refractive index, high solubility and low volume shrinkage, and which can be cured without the addition of an acid generator. A further object of the invention is to provide a method of manufacturing a cured film thereof.

Means for Solving the Problems

The inventors earlier discovered that hyperbranched polymers containing recurring units with a triazine ring and an aromatic ring have a high refractive index and are able, with the polymer alone, to achieve a high heat resistance, high transparency, high refractive index, high solubility and low volume shrinkage, and are thus suitable as film-forming compositions in the fabrication of electronic devices (Patent Document 5).

Based on these findings, the inventors have conducted further investigations and discovered that a photocurable film-forming composition which includes a triazine ring-containing polymer and, as a crosslinking agent, a polyfunctional epoxy compound and/or a polyfunctional acrylate compound is curable without using an initiator such as a photoacid generator, a photobase generator or a photoradical generator, and is capable of forming a cured film having a high refractive index and a high heat resistance.

Highly branched polymers are broadly divided into hyperbranched polymers and dendrimers.

As used herein, "hyperbranched polymer" refers to a highly branched polymer with an irregular branched structure that is obtained by, for example, polymerizing ABx-type polyfunctional monomers (where A and B represent functional groups that react with one another, and "x" on B is a number equal to 2 or more).

"Dendrimer" refers to a highly branched polymer which has a regular branched structure. Hyperbranched polymers are characterized by being easier to synthesize than dendrimers, and by the ease with which high-molecular-weight bodies can be synthesized.

Triazine ring-containing hyperbranched polymers have reportedly been synthesized for flame retardant applications (Non-Patent Document 1).

Accordingly, the invention provides:

1. A photocurable film-forming composition characterized by including a triazine-ring-containing polymer which includes a recurring unit structure of formula (1) below

[Chemical Formula 1]

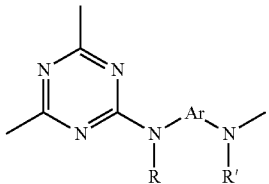
(1)

(wherein R and R' are each independently a hydrogen atom, an alkyl group, an alkoxy group, an aryl group or an aralkyl group; and Ar is at least one moiety selected from the group consisting of moieties of formulas (2) to (13) below

[Chemical Formula 2]

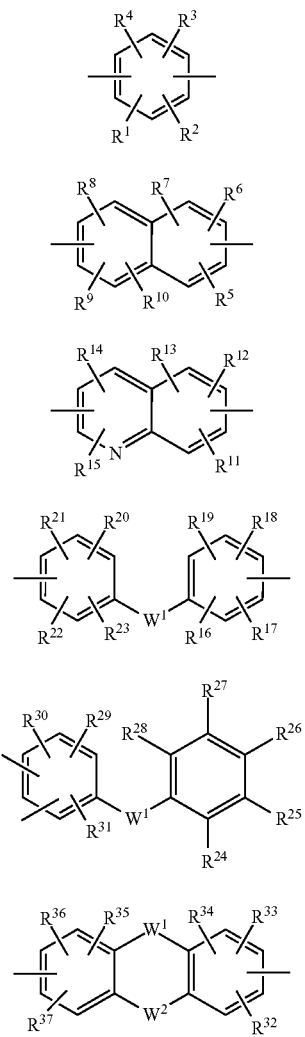

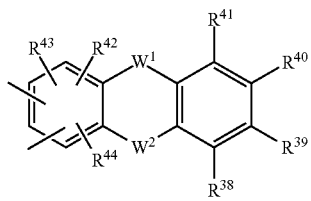
(8)

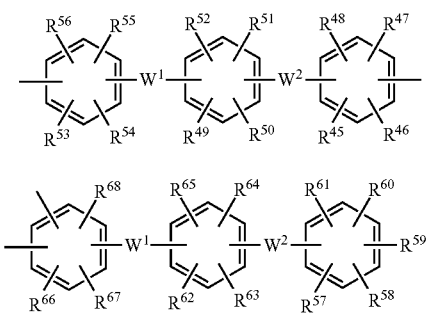
(9)

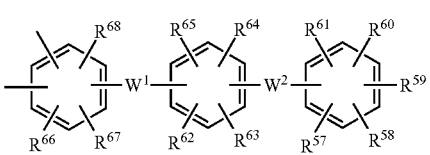
(10)

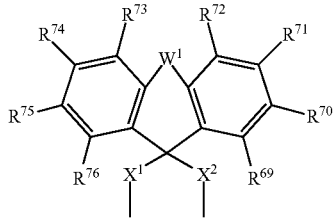
(11)

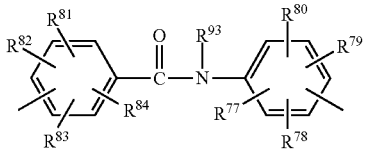
(12)

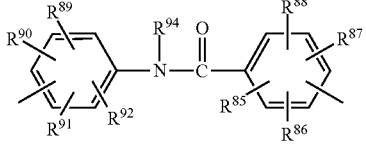
(13)

(in which $R^1$ to $R^{92}$ are each independently a hydrogen atom, a halogen atom, a carboxyl group, a sulfonyl group, an alkyl group which may have a branched structure of 1 to 10 carbons, or an alkoxy group which may have a branched structure of 1 to 10 carbons; $R^{93}$ and $R^{94}$ are hydrogen atoms or alkyl groups which may have a branched structure of 1 to 10 carbons; $W^1$ and $W^2$ are each independently a single bond, $CR^{95}R^{96}$ ($R^{95}$ and $R^{96}$ being each independently a hydrogen atom or an alkyl group which may have a branched structure of 1 to 10 carbons, with the proviso that $R^{95}$ and $R^{96}$ may together form a ring), C=O, O, S, SO, $SO_2$ or $NR^{97}$ ($R^{97}$ being a hydrogen atom or an alkyl group which may have a branched structure of 1 to 10 carbons); and $X^1$ and $X^2$ are each independently a single bond, an alkylene group which may have a branched structure of 1 to 10 carbons, or a group of formula (14) below

[Chemical Formula 3]

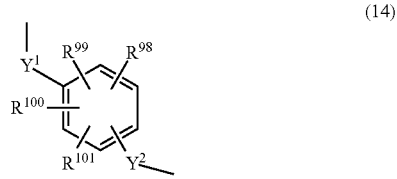

(14)

($R^{98}$ to $R^{101}$ being each independently a hydrogen atom, a halogen atom, a carboxyl group, a sulfonyl group, an alkyl group which may have a branched structure of 1 to 10 carbons, or an alkoxy group which may have a branched structure of 1 to 10 carbons; and $Y^1$ and $Y^2$ being each independently a single bond or an alkylene group which may have a branched structure of 1 to 10 carbons))) and a crosslinking agent, wherein the crosslinking agent is a polyfunctional epoxy compound and/or a polyfunctional (meth)acrylate compound;
2. The photocurable film-forming composition according to 1 above, wherein the crosslinking agent is a polyfunctional (meth)acrylate compound;
3. The photocurable film-forming composition according to 1 or 2 above, wherein the polyfunctional (meth)acrylate compound is a compound having an isocyanuric acid skeleton;
4. The photocurable film-forming composition according to 1 or 2 above, wherein the polyfunctional (meth)acrylate compound is a combination of a compound having an isocyanuric acid skeleton and a compound which at 25° C. is a liquid and has a viscosity of 5,000 mPa·s or less;
5. The photocurable film-forming composition according to 1 or 2 above, wherein the polyfunctional (meth)acrylate compound is a compound which at 25° C. is a liquid and has a viscosity of 5,000 mPa·s or less;
6. The photocurable film-forming composition according to 3 or 4 above, wherein the compound having an isocyanuric acid skeleton is tris[2-(acryloyloxy)ethyl]isocyanurate;
7. The photocurable film-forming composition according to any one of 1 to 6 above which includes from 1 to 25 parts by weight of the crosslinking agent per 100 parts by weight of the triazine ring-containing polymer;
8. The photocurable film-forming composition according to 1 above which includes no photoacid generator, no photobase generator and no photoradical polymerization initiator;
9. The photocurable film-forming composition according to any one of 2 to 7 above which includes no photoradical polymerization initiator;
10. A cured film obtained by photocuring the photocurable film-forming composition according to any one of 1 to 9 above;
11. A method of manufacturing a cured film, the method being comprised of irradiating with light and thereby curing the photocurable film-forming composition of any one of 1 to 9; and
12. An electronic device comprising a base material and the cured film of 10 above formed on the base material.

Advantageous Effects of the Invention

By way of this invention, there can be provided a photocurable film-forming composition that includes a triazine ring-containing hyperbranched polymer, which composition can be cured without using an initiator such as a photoacid generator, a photobase generator or a photoradical generator, and is capable, without the addition of a metal oxide, of forming a cured film that exhibits a high refractive index and a high heat resistance.

Because the photocurable film-forming composition of the invention does not include a metal oxide and is able, with the polymer alone, to exhibit a high refractive index, even in the course of a dry process such as etching or ashing, the etch rate is constant, enabling a film of uniform thickness to be obtained, and thus widening the process margin during device fabrication.

The cured film obtained from the inventive composition can be advantageously used as a component in the fabrication of electronic devices such as liquid-crystal displays, organic electroluminescent (EL) displays, optical semiconductor (LED) devices, solid-state image sensors, organic thin-film solar cells, dye-sensitized solar cells and organic thin-film transistors (TFT).

In particular, such a cured film can be advantageously used as the following solid-state image sensor components which are required to have especially high refractive indices: embedding films and planarizing films on photodiodes, planarizing films before and after color filters, microlenses, planarizing films on microlenses, and conformal films.

BRIEF DESCRIPTION OF THE DIAGRAMS

Figure 2:
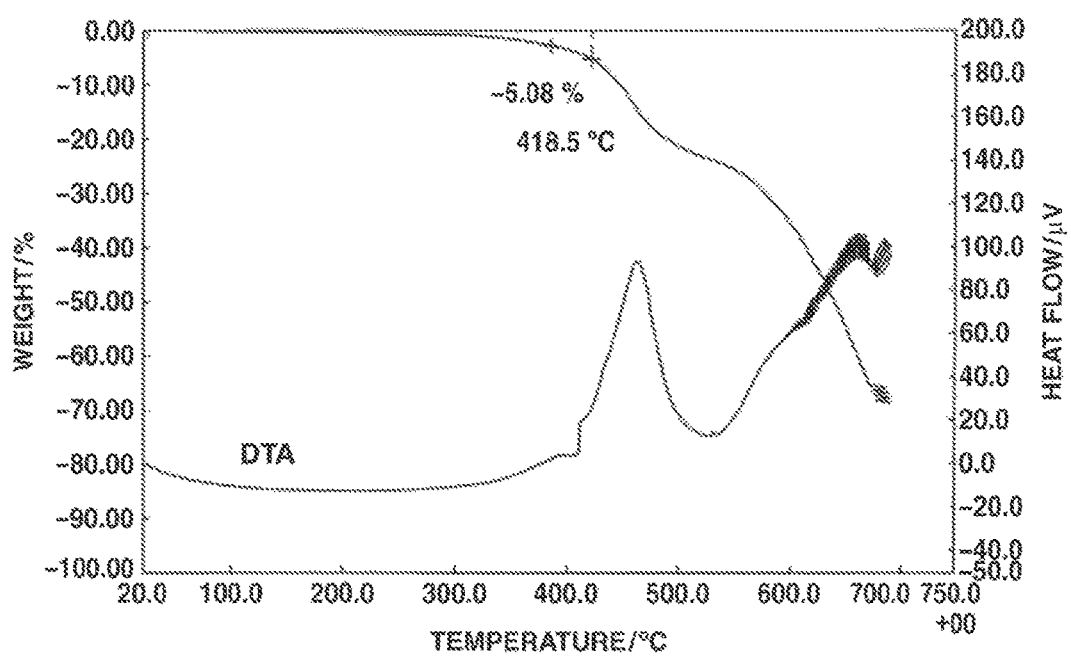

FIG. 1 is an $^1$H-NMR spectrum of the polymeric compound [3] obtained in Synthesis Example 1.
FIG. 2 is a plot showing the TG-DTA results for the polymeric compound [3] obtained in Synthesis Example 1.

EMBODIMENT FOR CARRYING OUT THE INVENTION

The invention is described more fully below.
The photocurable film-forming composition according to the present invention includes a triazine-ring-containing polymer having a recurring unit structure of formula (1) below and also includes, as a crosslinking agent, a polyfunctional epoxy compound and/or a polyfunctional (meth)acrylate compound.

[Chemical Formula 4]

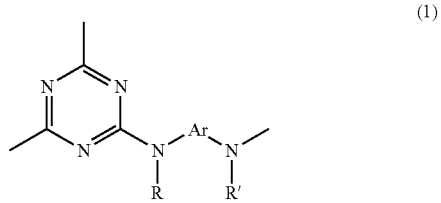

(1)

In the above formula, R and R' are each independently a hydrogen atom, an alkyl group, an alkoxy group, an aryl group or an aralkyl group.

In the invention, the number of carbons on the alkyl group, although not particularly limited, is preferably from 1 to 20. From the standpoint of further increasing the heat resistance of the polymer, the number of carbons is more preferably from 1 to 10, and even more preferably from 1 to 3. The alkyl group may have a linear, branched or cyclic structure.

Illustrative examples of alkyl groups include methyl, ethyl, n-propyl, isopropyl, cyclopropyl, n-butyl, isobutyl, s-butyl, t-butyl, cyclobutyl, 1-methylcyclopropyl, 2-methylcyclopropyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-metylcyclobutyl, 2-methylcyclobutyl, 3-methylcyclobutyl, 1,2-dimethylcyclopropyl, 2,3-dimethylcyclopropyl, 1-ethylcyclopropyl, 2-ethylcyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methylcyclopentyl, 2-methylcyclopentyl, 3-methylcyclopentyl, 1-ethylcyclobutyl, 2-ethylcyclobutyl, 3-ethylcyclobutyl, 1,2-dimethylcyclobutyl, 1,3-dimethylcyclobutyl, 2,2-dimthylcyclobutyl, 2,3-dimethylcyclobutyl, 2,4-dimethylcyclobutyl, 3,3-dimethylcyclobutyl, 1-n-propylcyclopropyl, 2-n-propylcyclopropyl, 1-isopropylcyclopropyl, 1-isopropylcyclopropyl, 1,2,2-trimethylcyclopropyl, 1,2,3-trimethylcyclopropyl, 2,2,3-trimethylcyclopropyl, 1-ethyl-2-methylcyclopropyl, 2-ethyl-1-methylcyclopropyl, 2-ethyl-2-methylcyclopropyl and 2-ethyl-3-methylcyclopropyl.

The number of carbons on the alkoxy group, although not particularly limited, is preferably from 1 to 20. From the standpoint of further increasing the heat resistance of the polymer, the number of carbons is more preferably from 1 to 10, and even more preferably from 1 to 3. The alkyl moiety thereon may have a linear, branched or cyclic structure.

Illustrative examples of alkoxy groups include methoxy, ethoxy, n-propoxy, isopropoxy, n-butoxy, isobutoxy, s-butoxy, t-butoxy, n-pentoxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy and 1-ethyl-2-methyl-n-propoxy.

The number of carbons on the aryl group, although not particularly limited, is preferably from 6 to 40. From the standpoint of further increasing the heat resistance of the polymer, the number of carbons is more preferably from 6 to 16, and even more preferably from 6 to 13.

Illustrative examples of aryl groups include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9-phenanthryl.

The number of carbons on the aralkyl group, although not particularly limited, is preferably from 7 to 20. The alkyl moiety thereon may be linear, branched or cyclic.

Illustrative examples of aralkyl groups include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl.

In above formula (1), Ar is at least one moiety selected from among those of formulas (2) to (13) below.

[Chemical Formula 5]

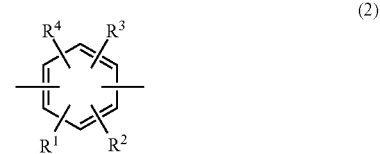

(2)

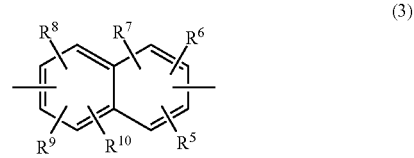

(3)

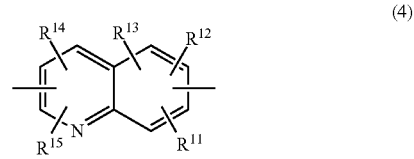

(4)

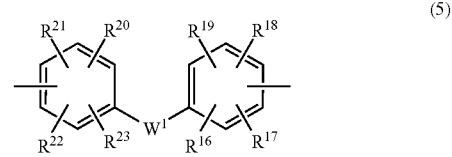

(5)

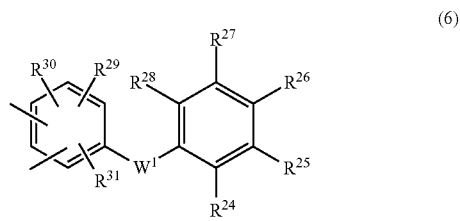

(6)

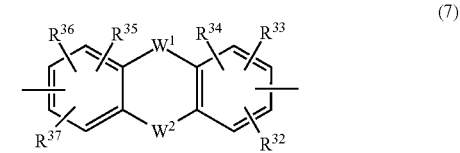

(7)

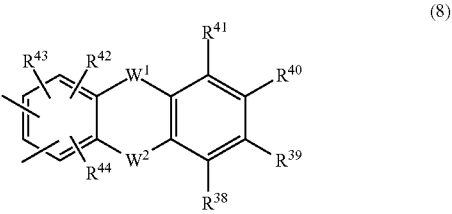

(8)

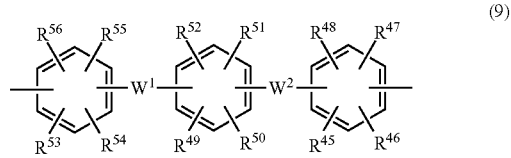

(9)

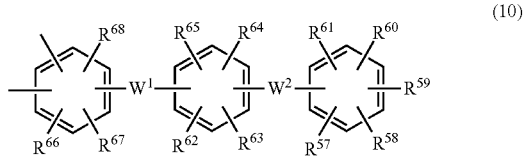

(10)

-continued

(11)
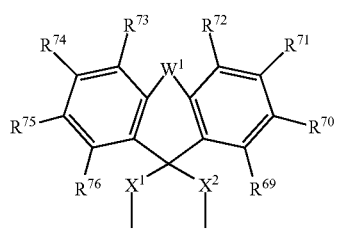

(12)

(13)
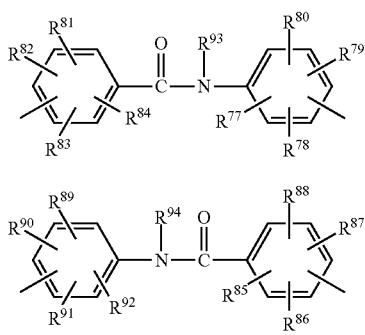

In the above formulas, $R^1$ to $R^{92}$ are each independently a hydrogen atom, a halogen atom, a carboxyl group, a sulfonyl group, an alkyl group which may have a branched structure of 1 to 10 carbons, or an alkoxy group which may have a branched structure of 1 to 10 carbons. $W^1$ and $W^2$ are each independently a single bond, $CR^{95}R^{96}$ (wherein $R^{95}$ and $R^{96}$ are each independently a hydrogen atom or an alkyl group which may have a branched structure of 1 to 10 carbons, with the proviso that $R^{95}$ and $R^{96}$ may together form a ring), $C=O$, $O$, $S$, $SO$, $SO_2$ or $NR^{97}$ (wherein $R^{97}$ is a hydrogen atom or an alkyl group which may have a branched structure of 1 to 10 carbons). $R^{93}$ and $R^{94}$ are hydrogen atoms or alkyl groups which may have a branched structure of 1 to 10 carbons.

Examples of the halogen atom include fluorine, chlorine, bromine and iodine.

These alkyl groups and alkoxy groups are exemplified by the same groups as mentioned above.

$X^1$ and $X^2$ are each independently a single bond, an alkylene group which may have a branched structure of 1 to 10 carbons, or a group of formula (14) below.

[Chemical Formula 6]

(14)
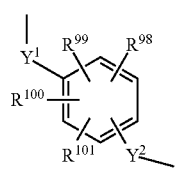

In the above formula, $R^{98}$ to $R^{101}$ are each independently a hydrogen atom, a halogen atom, a carboxyl group, a sulfonyl group, an alkyl group which may have a branched structure of 1 to 10 carbons, or an alkoxy group which may have a branched structure of 1 to 10 carbons. $Y^1$ and $Y^2$ are each independently a single bond or an alkylene group which may have a branched structure of 1 to 10 carbons. These halogen atoms, alkyl groups and alkoxy groups are exemplified by the same groups as mentioned above.

Illustrative examples of alkylene groups which may have a branched structure of 1 to 10 carbons include methylene, ethylene, propylene, trimethylene, tetramethylene and pentamethylene.

In particular, Ar is preferably at least one moiety of formulas (2) and (5) to (13), and more preferably at least one moiety of formulas (2), (5), (7), (8) and (11) to (13). Illustrative examples of aryl groups of formulas (2) to (13) include, but are not limited to, those having the following formulas.

[Chemical Formula 7]

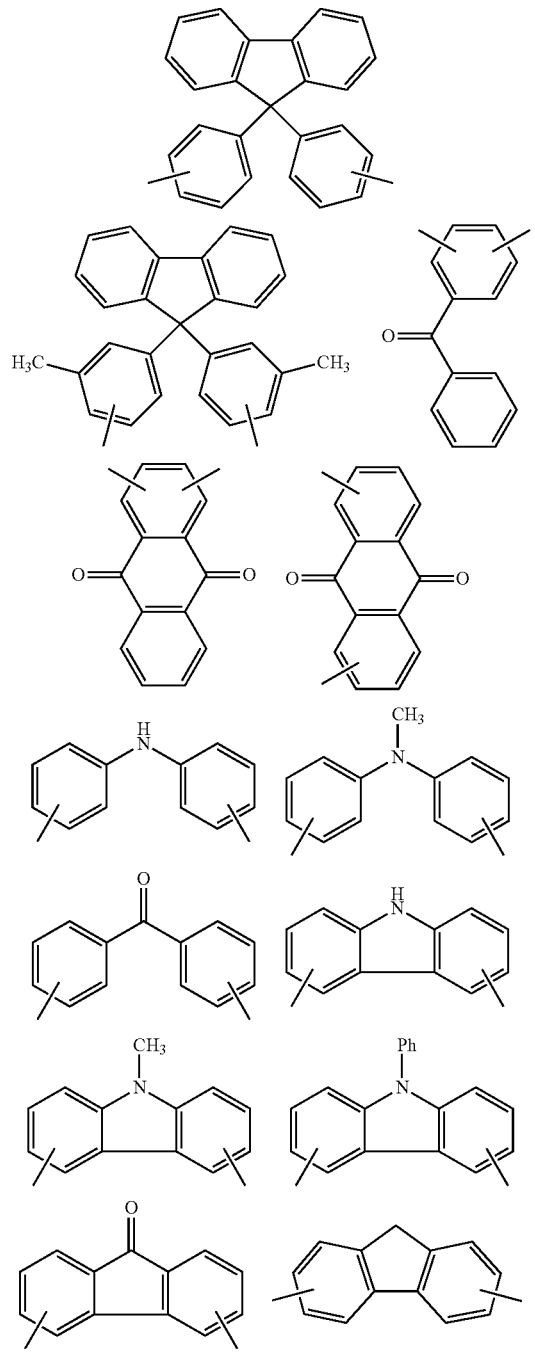

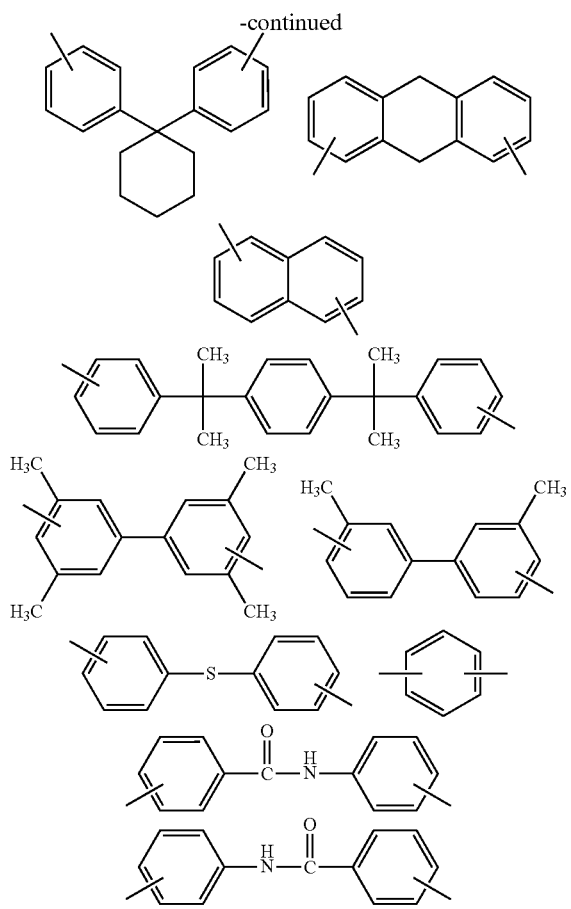

Of these, to obtain a polymer having a higher refractive index, the aryl groups of the following formulas are more preferred.

[Chemical Formula 8]

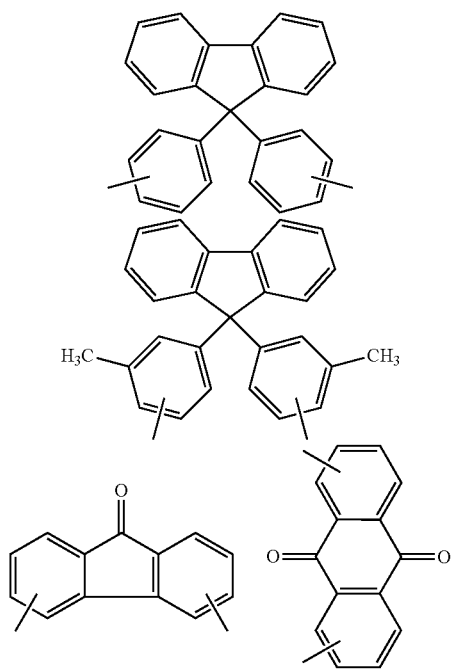

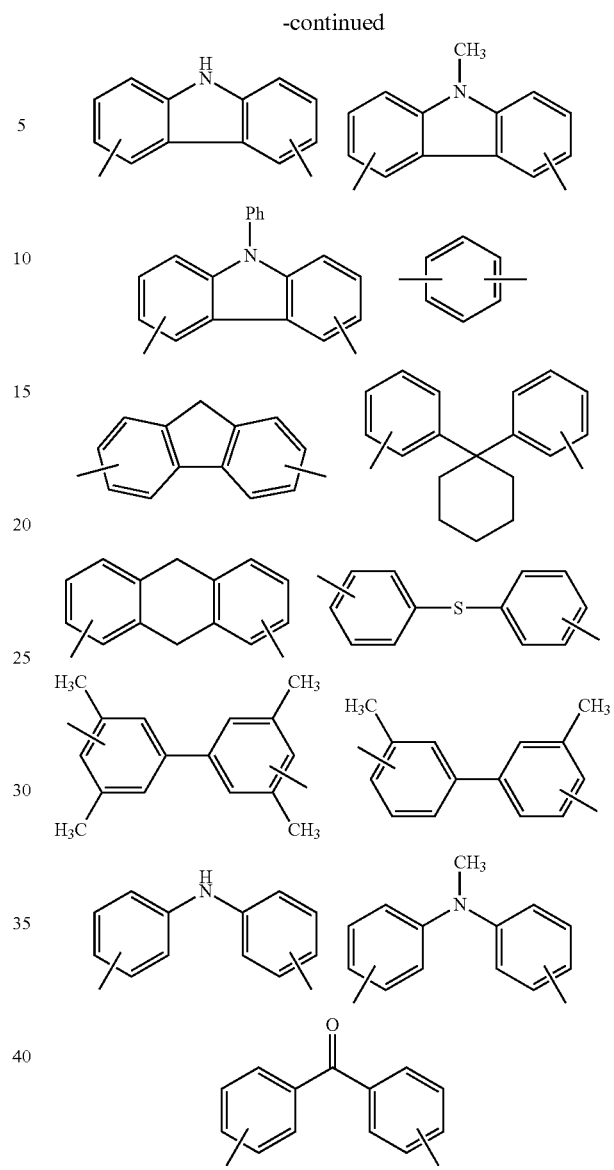

To further increase the solubility in highly safe solvents such as resist solvents, a recurring unit structure of formula (15) below is preferably included.

[Chemical Formula 9]

(15)

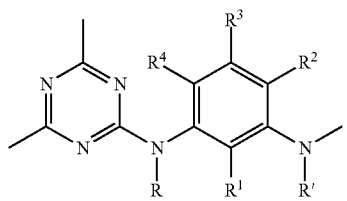

In this formula, R, R' and $R^1$ to $R^4$ are as defined above.

From such a standpoint, especially preferred recurring unit structures include those of formula (16) below, with highly branched polymers (hyperbranched polymers) of formula (17) below being most preferred.

[Chemical Formula 10]

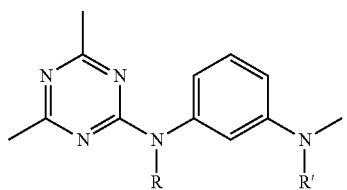

(16)

In this formula, R and R' are as defined above.

[Chemical Formula 11]

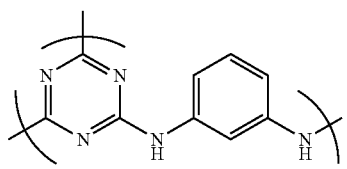

(17)

The polymer in the present invention has a weight-average molecular weight which, although not particularly limited, is preferably between 500 and 500,000, and more preferably between 500 and 100,000. To further enhance the heat resistance and lower the shrinkage ratio, the weight-average molecular weight is preferably at least 2,000. To further increase the solubility and lower the viscosity of the resulting solution, the weight-average molecular weight is preferably not more than 50,000, more preferably not more than 30,000, and even more preferably not more than 10,000.

The weight-average molecular weight in the invention is the weight-average molecular weight measured by gel permeation chromatography (GPC) against a polystyrene standard.

The triazine ring-containing polymer of the invention may be prepared by the method disclosed in above-mentioned Patent Document 5.

For example, as shown in Scheme 1 below, a highly branched polymer (hyperbranched polymer) having the recurring structure (17') can be obtained by reacting a cyanuric halide (18) with an m-phenylenediamine compound (19) in a suitable organic solvent.

Scheme 1

[Chemical Formula 12]

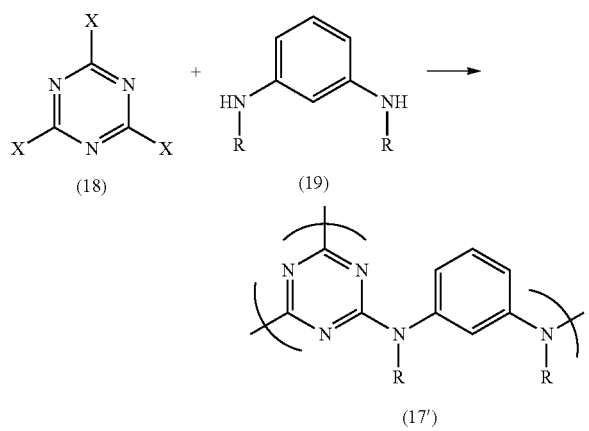

In the above formula, each occurrence of X is independently a halogen atom; and R is as defined above.

As shown in Scheme 2 below, a highly branched polymer (hyperbranched polymer) having the recurring structure (17') can be synthesized from a compound (20) obtained by reacting equimolar amounts of a cyanuric halide (18) and an m-phenylenediamine compound (19) in a suitable organic solvent.

Scheme 2

[Chemical Formula 13]

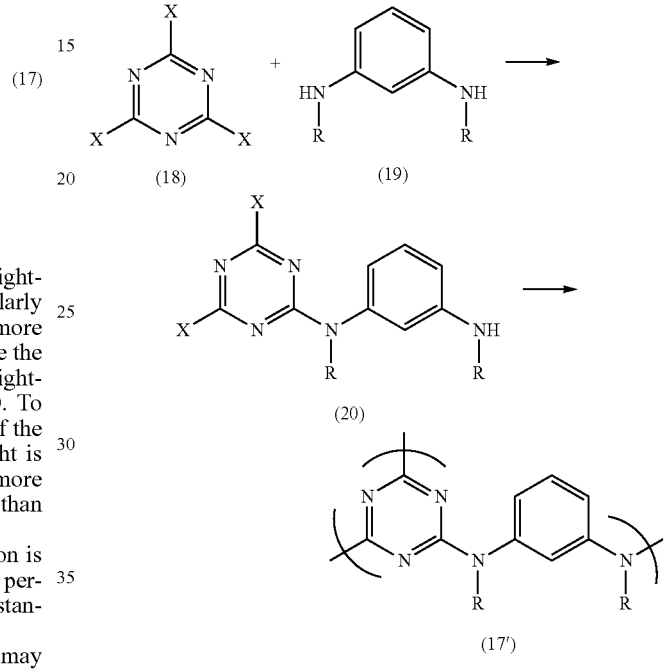

In the above formula, each occurrence of X is independently a halogen atom; and R is as defined above.

In the methods of Schemes 1 and 2, the respective starting materials may be charged in any suitable amounts so long as the target polymer is obtained, although the use of from 0.01 to 10 equivalents of the diamino compound (19) per equivalent of the triazine compound (18) is preferred.

In the method of Scheme 1 in particular, it is preferable to avoid using 3 equivalents of the diamino compound (19) per 2 equivalents of the cyanuric halide (18). By having the number of equivalents of the respective functional groups differ from this ratio, the formation of a gel can be prevented.

To obtain highly branched polymers (hyperbranched polymers) of various molecular weights which have many terminal triazine rings, it is preferable to use the diamino compound (19) in an amount of less than 3 equivalents per 2 equivalents of the cyanuric halide (18).

On the other hand, to obtain highly branched polymers (hyperbranched polymers) of various molecular weights which have many terminal amines, it is preferable to use the cyanuric halide (18) in an amount of less than 2 equivalents per 3 equivalents of the diamino compound (19).

For example, in cases where a thin film has been produced, in order for the film to have an excellent transparency and light resistance, a highly branched polymer (hyperbranched polymer) having many terminal triazine rings is preferred.

By suitably regulating the amounts of the diamino compound (19) and the cyanuric halide (18) in this way, the molecular weight of the resulting highly branched polymer (hyperbranched polymer) can easily be regulated.

Various solvents that are commonly used in this type of reaction may be used as the organic solvent. Illustrative examples include tetrahydrofuran, dioxane, dimethylsulfoxide; amide solvents such as N,N-dimethylformamide, N-methyl-2-pryrrolidone, tetramethylurea, hexamethylphosphoramide, N,N-dimethylacetamide, N-methyl-2-piperidone, N,N-dimethylethyleneurea, N,N,N',N'-tetramethylmalonamide, N-methylcaprolactam, N-acetylpyrrolidine, N,N-diethylacetamide, N-ethyl-2-pyrrolidone, N,N-dimethylpropionamide, N,N-dimethylisobutyramide, N-methylformamide and N,N'-dimethylpropyleneurea; and mixed solvents thereof.

Of the above, N,N-dimethylformamide, dimethylsulfoxide, N-methyl-2-pyrrolidone, N,N-dimethylacetamide and mixed solvents thereof are preferred. N,N-Dimethylacetamide and N-methyl-2-pyrrolidone are especially preferred.

In the Scheme 1 reaction and the second stage reaction in Scheme 2, the reaction temperature may be suitably set in the range from the melting point of the solvent used to the boiling point of the solvent, although the temperature is preferably from about 0° C. to about 150° C., and more preferably from 60° C. to 100° C.

In the Scheme 1 reaction in particular, to suppress linearity and increase the degree of branching, the reaction temperature is preferably from 60° C. to 150° C., more preferably from 80° C. to 150° C., and even more preferably from 80° C. to 120° C.

In the first stage reaction of Scheme 2, the reaction temperature may be suitably set in the range from the melting point of the solvent used to the boiling point of the solvent, with a temperature of from about −50° C. to about 50° C. being preferred, a temperature of from about −20° C. to about 50° C. being more preferred, a temperature of from about −10° C. to about 50° C. being even more preferred, and a temperature of from −10° C. to 10° C. being still more preferred.

In the Scheme 2 method in particular, the use of a two-stage process with a first step involving reaction at from −50° C. to 50° C., followed by a second step involving reaction at from 60° C. to 150° C. is preferred.

In each of the above reactions, the ingredients may be added in any order. However, in the Scheme 1 reaction, the best method is to heat a solution containing either the cyanuric halide (18) or the diamino compound (19) and the organic solvent to a temperature of from 60° C. to 150° C., and preferably from 80° C. to 150° C., then add the remaining ingredient—the diamino compound (19) or the cyanuric halide (18)—to the resulting solution at this temperature.

In this case, either ingredient may be used as the ingredient which is initially dissolved in the solvent or as the ingredient which is subsequently added, although a method wherein the cyanuric halide (18) is added to a heated solution of the diamino compound (19) is preferred.

In the Scheme 2 reactions, either ingredient may be used as the ingredient which is initially dissolved in the solvent or as the ingredient which is subsequently added, although a method wherein the diamino compound (19) is added to a cooled solution of the cyanuric halide (18) is preferred.

The subsequently added ingredient may be added neat or may be added as a solution of the ingredient dissolved in an organic solvent such as any of those mentioned above. However, taking into account the ease of operation and the controllability of the reaction, the latter approach is preferred.

Also, addition may be carried out gradually such as in a dropwise manner, or the entire amount may be added all at once in a batchwise manner.

In Scheme 1, even when the reaction is carried out in a single stage (without raising the temperature in a stepwise fashion) in a heated state and after both compounds have been mixed together, the desired triazine ring-containing highly branched polymer (hyperbranched polymer) can be obtained without gelation.

In the Scheme 1 reaction and the second stage reaction in Scheme 2, various bases which are commonly used during or after polymerization may be added.

Illustrative examples of such bases include potassium carbonate, potassium hydroxide, sodium carbonate, sodium hydroxide, sodium bicarbonate, sodium ethoxide, sodium acetate, lithium carbonate, lithium hydroxide, lithium oxide, potassium acetate, magnesium oxide, calcium oxide, barium hydroxide, trilithium phosphate, trisodium phosphate, tripotassium phosphate, cesium fluoride, aluminum oxide, ammonia, trimethylamine, triethylamine, diisopropylamine, diisopropylethylamine, N-methylpiperidine, 2,2,6,6-tetramethyl-N-methylpiperidine, pyridine, 4-dimethylaminopyridine and N-methylmorpholine.

The amount of base added per equivalent of the cyanuric halide (18) is preferably from 1 to 100 equivalents, and more preferably from 1 to 10 equivalents. These bases may be used in the form of an aqueous solution.

In the methods of both schemes, following reaction completion, the product can be easily purified by a suitable technique such as reprecipitation.

Also, in the present invention, some portion of the halogen atoms on at least one terminal triazine ring may be capped with, for example, an alkyl, aralkyl, aryl, alkylamino, alkoxysilyl-containing alkylamino, aralkylamino, arylamino, alkoxy, aralkyloxy, aryloxy or ester group.

Of these, alkylamino, alkoxysilyl-containing alkylamino, aralkylamino and arylamino groups are preferred. Alkylamino and arylamino groups are more preferred. Arylamino groups are even more preferred.

The above alkyl groups and alkoxy groups are exemplified in the same way as described earlier in the specification.

Illustrative examples of ester groups include methoxycarbonyl and ethoxycarbonyl.

Illustrative examples of aryl groups include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9-phenanthryl.

Illustrative examples of aralkyl groups include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl.

Illustrative examples of alkylamino groups include methylamino, ethylamino, n-propylamino, isopropylamino, n-butylamino, isobutylamino, s-butylamino, t-butylamino, n-pentylamino, 1-methyl-n-butylamino, 2-methyl-n-butylamino, 3-methyl-n-butylamino, 1,1-dimethyl-n-propylamino, 1,2-dimethyl-n-propylamino, 2,2-dimethyl-n-propylamino, 1-ethyl-n-propylamino, n-hexylamino, 1-methyl-n-pentylamino, 2-methyl-n-pentylamino, 3-methyl-n-pentylamino, 4-methyl-n-pentylamino, 1,1-dimethyl-n- butylamino, 1,2-dimethyl-n-butylamino, 1,3-dimethyl-n-butylamino, 2,2-dimethyl-n-butylamino, 2,3-dimethyl-n-butylamino, 3,3-dimethyl-n-butylamino, 1-ethyl-n-butylamino, 2-ethyl-n-butylamino, 1,1,2-trimethyl-n-propylamino, 1,2,2-trimethyl-n-propylamino, 1-ethyl-1-methyl-n-propylamino and 1-ethyl-2-methyl-n-propylamino.

Illustrative examples of aralkylamino groups include benzylamino, methoxycarbonylphenylmethylamino, ethoxycarbonylphenylmethylamino, p-methylphenylmethylamino, m-methylphenylmethylamino, o-ethylphenylmethylamino, m-ethylphenylmethylamino, p-ethylphenylmethylamino, 2-propylphenylmethylamino, 4-isopropylphenylmethylamino, 4-isobutylphenylmethylamino, naphthylmethylamino, methoxycarbonylnaphthylmethylamino and ethoxycarbonylnaphthylmethylamino.

Illustrative examples of arylamino groups include phenylamino, methoxycarbonylphenylamino, ethoxycarbonylphenylamino, naphthylamino, methoxycarbonylnaphthylamino, ethoxycarbonylnaphthylamino, anthranylamino, pyrenylamino, biphenylamino, terphenylamino and fluorenylamino.

Alkoxysilyl-containing alkylamino groups are exemplified by monoalkoxysilyl-containing alkylamino groups, dialkoxysilyl-containing alkylamino groups and trialkoxysilyl-containing alkylamino groups. Illustrative examples include 3-trimethoxysilylpropylamino, 3-triethoxysilylpropylamino, 3-dimethylethoxysilylpropylamino, 3-methyldiethoxysilylpropylamino, N-(2-aminoethyl)-3-dimethylmethoxysilylpropylamino, N-(2-aminoethyl)-3-methyldimethoxysilylpropylamino and N-(2-aminoethyl)-3-trimethoxysilylpropylamino.

Illustrative examples of aryloxy groups include phenoxy, naphthoxy, anthranyloxy, pyrenyloxy, biphenyloxy, terphenyloxy and fluorenyloxy.

Illustrative examples of aralkyloxy groups include benzyloxy, p-methylphenylmethyloxy, m-methylphenylmethyloxy, o-ethylphenylmethyloxy, m-ethylphenylmethyloxy, p-ethylphenylmethyloxy, 2-propylphenylmethyloxy, 4-isopropylphenylmethyloxy, 4-isobutylphenylmethyloxy and α-naphthylmethyloxy.

These groups can be easily introduced by substituting a halogen atom on a triazine ring with a compound that furnishes the corresponding substituent. For example, as shown in Scheme 3 below, by adding an aniline derivative and inducing a reaction, a highly branched polymer (21) having a phenylamino group on at least one end is obtained.

Scheme 3

[Chemical Formula 14]

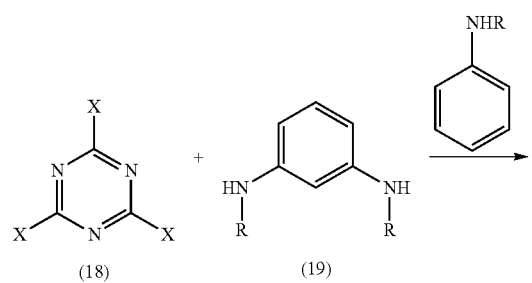

(18)  (19)

-continued

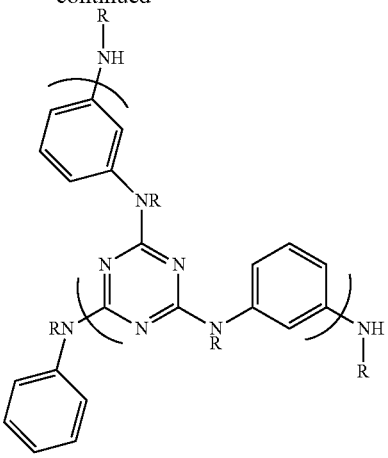

(21)

In these formulas, X and R are as defined above.

At this time, by reacting the cyanuric halide with a diaminoaryl compound while at the same time charging an organic monoamine, i.e., in the presence of an organic monoamine, it is possible to obtain a flexible hyperbranched polymer having a low degree of branching in which the rigidity of the hyperbranched polymer has been diminished.

Because the hyperbranched polymer obtained in this way has an excellent solubility in a solvent (meaning that aggregation is inhibited) and has an excellent crosslinkability with a crosslinking agent, it is especially advantageous when used as a composition in combination with the subsequently described crosslinking agent.

An alkyl monoamine, aralkyl monoamine or aryl monoamine may be used here as the organic monoamine.

Illustrative examples of alkyl monoamines include methylamine, ethylamine, n-propylamine, isopropylamine, n-butylamine, isobutylamine, s-butylamine, t-butylamine, n-pentylamine, 1-methyl-n-butylamine, 2-methyl-n-butylamine, 3-methyl-n-butylamine, 1,1-dimethyl-n-propylamine, 1,2-dimethyl-n-propylamine, 2,2-dimethyl-n-propylamine, 1-ethyl-n-propylamine, n-hexylamine, 1-methyl-n-pentylamine, 2-methyl-n-pentylamine, 3-methyl-n-pentylamine, 4-methyl-n-pentylamine, 1,1-dimethyl-n-butylamine, 1,2-dimethyl-n-butylamine, 1,3-dimethyl-n-butylamine, 2,2-dimethyl-n-butylamine, 2,3-dimethyl-n-butylamine, 3,3-dimethyl-n-butylamine, 1-ethyl-n-butylamine, 2-ethyl-n-butylamine, 1,1,2-trimethyl-n-propylamine, 1,2,2-trimethyl-n-propylamine, 1-ethyl-1-methyl-n-propylamine, 1-ethyl-2-methyl-n-propylamine and 2-ethylhexylamine.

Illustrative examples of aralkyl monoamines include benzylamine, p-methoxycarbonylphenylbenzyl, p-ethoxycarbonylbenzylamine, p-methylbenzylamine, m-methylbenzylamine and o-methoxybenzylamine.

Illustrative examples of aryl monoamines include aniline, p-methoxycarbonylaniline, p-ethoxycarbonylaniline, p-methoxyaniline, 1-naphthylamine, 2-naphthylamine, anthranylamine, 1-aminopyrene, 4-biphenylylamine, o-phenylaniline, 4-amino-p-terphenyl and 2-aminofluorene.

In this case, the amount of organic monoamine used per equivalent of the cyanuric halide is set to preferably from 0.05 to 500 equivalents, more preferably from 0.05 to 120 equivalents, and even more preferably from 0.05 to 50 equivalents.

To suppress linearity and increase the degree of branching, the reaction temperature in this case is preferably from 60 to 150° C., more preferably from 80 to 150° C., and even more preferably from 80 to 120° C.

However, mixing of the three ingredients—an organic monoamine, a cyanuric halide and a diaminoaryl compound—may be carried out at a low temperature, in which case the temperature is set to preferably from about −50° C. to about 50° C., more preferably from about −20° C. to about 50° C., and even more preferably from about −20° C. to about 10° C. Following low-temperature charging, it is preferable to raise the temperature without interruption (in a single step) to the polymerization temperature and carry out the reaction.

Alternatively, the mixing of two ingredients—a cyanuric halide and a diaminoaryl compound—may be carried out at a low temperature, in which case the temperature is set to preferably from about −50° C. to about 50° C., more preferably from about −20° C. to about 50° C., and even more preferably from about −20° C. to about 10° C. Following low-temperature charging, it is preferable to raise the temperature without interruption (in a single step) to the polymerization temperature and carry out the reaction.

The reaction of the cyanuric halide with the diaminoaryl compound in the presence of such an organic monoamine may be carried out using an organic solvent like those mentioned above.

In the photocurable film-forming composition of the invention, a polyfunctional epoxy compound and/or a polyfunctional (meth)acrylate compound is used as a crosslinking agent.

The polyfunctional epoxy compound is not particularly limited, provided it has two or more epoxy groups on the molecule.

Illustrative examples include tris(2,3-epoxypropyl) isocyanurate, 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, 1,2-cyclohexanedicarboxylic acid diglycidyl ester, 4,4′-methylenebis(N,N-diglycidylaniline), 3,4-epoxycyclohexylmethyl-3,4-epoxycyclohexanecarboxylate, trimethylolethane triglycidyl ether, bisphenol A diglycidyl ether and pentaerythritol polyglycidyl ether.

Examples of commercial products that may be used include epoxy resins having at least two epoxy groups, such as YH-434 and YH-434L (from Tohto Kasei Co., Ltd.); epoxy resins having a cyclohexene oxide structure, such as Epolead GT-401, GT-403, GT-301 and GT-302, and also Celloxide 2021 and Celloxide 3000 (all from Daicel Chemical Industries, Ltd.); bisphenol A-type epoxy resins such as Epikote (now "jER") 1001, 1002, 1003, 1004, 1007, 1009, 1010 and 828 (all from Japan Epoxy Resin Co., Ltd.); bisphenol F-type epoxy resins such as Epikote (now "jER") 807 (Japan Epoxy Resin Co., Ltd.); phenol-novolak type epoxy resins such as Epikote (now "jER") 152 and 154 (Japan Epoxy Resin Co., Ltd.), and EPPN 201 and 202 (Nippon Kayaku Co., Ltd.); cresol-novolak type epoxy resins such as EOCN-102, EOCN-103S, EOCN-104S, EOCN-1020, EOCN-1025 and EOCN-1027 (Nippon Kayaku Co., Ltd.), and Epikote (now "jER") 180S75 (Japan Epoxy Resin Co., Ltd.); alicyclic epoxy resins such as Denacol EX-252 (Nagase ChemteX Corporation), CY175, CY177 and CY179 (Ciba-Geigy AG), Araldite CY-182, CY-192 and CY-184 (Ciba-Geigy AG), Epiclon 200 and 400 (DIC Corporation), Epikote (now "jER") 871 and 872 (Japan Epoxy Resin Co., Ltd.), and ED-5661 and ED-5662 (Celanese Coating KK); and aliphatic polyglycidyl ethers such as Denacol EX-611, EX-612, EX-614, EX-622, EX-411, EX-512, EX-522, EX-421, EX-313, EX-314 and EX-321 (Nagase ChemteX Corporation).

In addition, the polyfunctional (meth)acrylate compound is not particularly limited, provided it has two or more (meth)acryl groups on the molecule.

Illustrative examples include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerol triacrylate, ethoxylated glycerol trimethacrylate, ethoxylated pentaerythritol tetraacrylate, ethoxylated pentaerythritol tetramethacrylate, ethoxylated dipentaerythritol hexaacrylate, polyglycerol monoethylene oxide polyacrylate, polyglycerol polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylolpropane triacrylate, trimethylolpropane trimethacrylate, tricyclodecane dimethanol diacrylate, tricyclodecane dimethanol dimethacrylate, 1,6-hexanediol diacrylate and 1,6-hexanediol dimethacrylate.

The polyfunctional (meth)acrylate compound may be acquired as a commercial product, illustrative examples of which include NK Ester A-200, A-400, A-600, A-1000, A-9300 (tris[2-(acryloyloxy)ethyl] isocyanurate), A-9300-1CL, A-TMPT, UA-53H, 1G, 2G, 3G, 4G, 9G, 14G, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3EO, A-TMPT-9EO, ATM-4E and ATM-35E (all from Shin-Nakamura Chemical Co., Ltd.); KAYARAD™ DPEA-12, PEG400DA, THE-330 and RP-1040 (all from Nippon Kayaku Co., Ltd.); M-210 and M-350 (from Toagosei Co., Ltd.); KAYARAD™ DPHA, NPGDA and PET30 (Nippon Kayaku Co., Ltd.); NK Ester A-DPH, A-TMPT, A-DCP, A-HD-N, TMPT, DCP, NPG and HD-N (all from Shin-Nakamura Chemical Co., Ltd.); NK Oligo U-15HA (Shin-Nakamura Chemical Co., Ltd.); and NK Polymer Vanaresin GH-1203 (Shin-Nakamura Chemical Co., Ltd.).

Of these, from the standpoint of both the ability to suppress a decline in refractive index by including a crosslinking agent and also rapidly promoting a curing reaction, a polyfunctional (meth)acrylate compound is preferred. In particular, owing to their excellent compatibility with triazine ring-containing polymers, polyfunctional (meth)acrylate compounds having the isocyanuric acid skeleton described below are more preferred.

Polyfunctional (meth)acrylate compounds having such skeletons are exemplified by NK Ester A-9300 and A-9300-1CL (both of which are from Shin-Nakamura Chemical Co., Ltd.).

[Chemical Formula 15]

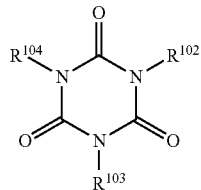

In the above formula, $R^{102}$ to $R^{104}$ are each independently a monovalent organic group having at least one terminal (meth)acryl group.

From the standpoint of further enhancing the rate of cure and also increasing the solvent resistance, acid resistance and alkali resistance of the resulting cured film, it is advantageous to use a polyfunctional (meth)acrylate compound (referred to below as a "low-viscosity crosslinking agent") which at 25° C. is a liquid and has a viscosity of 5,000 mPa·s or less, preferably from 1 to 3,000 mPa·s, more preferably from 1 to 1,000 mPa·s, and even more preferably from 1 to 500 mPa·s, either singly or as a combination of two or more thereof, or in combination with the above-described polyfunctional (meth)acrylate compound having an isocyanuric acid skeleton.

Such a low-viscosity crosslinking agent too may be acquired as a commercial product. Illustrative examples include, of the above-mentioned polyfunctional (meth)acrylate compounds, crosslinking agents in which the chain lengths between (meth)acryl groups are relatively long, such as NK Ester A-GLY-3E (85 mPa·s at 25° C.), A-GLY-9E (95 mPa·s at 25° C.), A-GLY-20E (200 mPa·s at 25° C.), A-TMPT-3EO (60 mPa·s at 25° C.), A-TMPT-9EO (100 mPa·s at 25° C.), ATM-4E (150 mPa·s at 25° C.) and ATM-35E (350 mPa·s at 25° C.) (all from Shin-Nakamura Chemical Co., Ltd.).

In addition, to enhance the alkali resistance of the resulting cured film, it is preferable to use a combination of NK Ester A-GLY-20E (Shin-Nakamura Chemical Co., Ltd.) and the above-described polyfunctional (meth)acrylate compound having an isocyanuric acid skeleton.

The above crosslinking agent may be used singly or two or more may be used in combination. The amount of crosslinking agent used per 100 parts by weight of the triazine ring-containing polymer is preferably from 1 to 100 parts by weight. From the standpoint of the solvent resistance, the lower limit is preferably 2 parts by weight, and more preferably 5 parts by weight. From the standpoint of control of the refractive index, the upper limit is preferably 25 parts by weight, and more preferably 20 parts by weight.

With the promotion of photocuring, the photocurable film-forming composition of the invention gives a cured film using only the above-described triazine ring-containing compound and the crosslinking agent, although initiators corresponding to the respective crosslinking agents may also be included therein.

In cases where a polyfunctional epoxy compound is used as the crosslinking agent, use may also be made of a photoacid generator or a photobase generator.

The photoacid generator used may be one that is suitably selected from among known photoacid generators. For example, use may be made of onium salt derivatives such as diazonium salts, sulfonium salts and iodonium salts.

Illustrative examples include aryldiazonium salts such as phenyldiazonium hexafluorophosphate, 4-methoxyphenyldiazonium hexafluoroantimonate and 4-methylphenyldiazonium hexafluorophosphate; diaryliodonium salts such as diphenyliodonium hexafluoroantimonate, di(4-methylphenyl)iodonium hexafluorophosphate and di(4-tert-butylphenyl)iodonium hexafluorophosphate; and triarylsulfonium salts such as triphenylsulfonium hexafluoroantimonate, tris(4-methoxyphenyl)sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenylsulfide bishexafluoro-antimonate, 4,4'-bis(diphenylsulfonio)phenylsulfide bishexafluoro-phosphate, 4,4'-bis[di(β-hydroxyethoxy)phenylsulfonio]phenylsulfide bishexafluoroantimonate, 4,4'-bis[di(β-hydroxyethoxy)phenylsulfonio]phenylsulfide bishexafluorophosphate, 4-[4'-(benzoyl)phenylthio]phenyl-di(4-fluorophenyl)sulfonium hexafluoroantimonate and 4-[4'-(benzoyl)phenylthio]phenyl-di(4-fluorophenyl)sulfonium hexafluorophosphate.

Commercial products may be used as these onium salts. Illustrative examples include San-Aid SI-60, SI-80, SI-100, SI-60L, SI-80L, SI-100L, SI-L145, SI-L150, SI-L160, SI-L110 and SI-L147 (all available from Sanshin Chemical Industry Co., Ltd.); UVI-6950, UVI-6970, UVI-6974, UVI-6990 and UVI-6992 (all available from Union Carbide); CPI-10OP, CPI-100A, CPI-200K and CPI-200S (all available from San-Apro Ltd.); Adeka Optomer SP-150, SP-151, SP-170 and SP-171 (all available from Adeka Corporation), Irgacure 261 (BASF); CI-2481, CI-2624, CI-2639 and CI-2064 (Nippon Soda Co., Ltd.); CD-1010, CD-1011 and CD-1012 (Sartomer Company); DS-100, DS-101, DAM-101, DAM-102, DAM-105, DAM-201, DSM-301, NAI-100, NAI-101, NAI-105, NAI-106, SI-100, SI-101, SI-105, SI-106, PI-105, NDU-105, BENZOIN TOSYLATE, MBZ-101, MBZ-301, PYR-100, PYR-200, DNB-101, NB-101, NB-201, BBI-101, BBI-102, BBI-103 and BBI-109 (all from Midori Kagaku Co., Ltd.); PCI-061T, PCI-062T, PCI-020T and PCI-022T (all from Nippon Kayaku Co., Ltd.); and IBPF and IBCF (Sanwa Chemical Co., Ltd.).

The photobase generator used may be one selected from among known photobase generators. For example, use may be made of Co-amine complex-type, oxime carboxylic acid ester-type, carbamic acid ester-type and quaternary ammonium salt-type photobase generators.

Illustrative examples include 2-nitrobenzylcyclohexyl carbamate, triphenylmethanol, O-carbamoylhydroxylamide, O-carbamoyloxime, [[(2,6-dinitrobenzyl)oxy]carbonyl]cyclohexylamine, bis[[(2-nitrobenzyl)oxy]carbonyl]hexane-1,6-diamine, 4-(methylthiobenzoyl)-1-methyl-1-morpholinoethane, (4-morpholinobenzoyl)-1-benzyl-1-dimethylaminopropane, N-(2-nitrobenzyloxycarbonyl)pyrrolidine, hexaamminecobalt(III) tris(triphenylmethylborate), 2-benzyl-2-dimethylamino-1-(4-morpholinophenyl)butanone, 2,6-dimethyl-3,5-diacetyl-4-(2'-nitrophenyl)-1,4-dihydropyridine and 2,6-dimethyl-3,5-diacetyl-4-(2',4'-dinitrophenyl)-1,4-dihydropyridine.

A commercial product may be used as the photobase generator. Illustrative examples include TPS-OH, NBC-101 and ANC-101 (all available under these product names from Midori Kagaku Co., Ltd.).

In cases where a photoacid or photobase generator is used, the generator is used in the range of preferably 0.1 to 15 parts by weight, and more preferably 1 to 10 parts by weight, per 100 parts by weight of the polyfunctional epoxy compound.

If necessary, from 1 to 100 parts by weight of an epoxy resin curing agent may also be included per 100 parts by weight of the polyfunctional epoxy compound.

In cases where a polyfunctional (meth)acrylate compound is used, a photoradical polymerization initiator may also be used.

A known photoradical initiator may be suitably selected and used as the photoradical initiator. Exemplary photoradical initiators include acetophenones, benzophenones, Michler's benzoyl benzoate, amyloxime ester, tetramethylthiuram monosulfide and thioxanthones.

Photocleavable photoradical initiators are especially preferred. Photocleavable photoradical initiators are listed on page 159 of *Saishin UV Koka Gijutsu* [Recent UV Curing Technology] (publisher, K. Takausu; published by Gijutsu Joho Kyokai KK; 1991).

Examples of commercial photoradical initiators include those available from BASF under the trade names Irgacure 184, 369, 651, 500, 819, 907, 784, 2959, CGI1700, CGI1750, CGI1850 and CG24-61, and the trade names Darocur 1116 and 1173; that available from BASF under the trade name Lucirin TPO; that available from UCB under the trade name Ubecryl P36; and those available under the trade names Esacure KIP150, KIP65LT, KIP100F, KT37, KT55, KT046 and KIP75/B from the Fratelli Lamberti Company.

The photoradical initiator is used in the range of preferably from 0.1 to 15 parts by weight, and more preferably from 1 to 10 parts by weight, per 100 parts by weight of the polyfunctional (meth)acrylate compound.

Adding any of various solvents to the photocurable film-forming composition of the invention so as to dissolve the triazine ring-containing polymer prior to use is advantageous.

In such a case, use may be made of the same solvent as was used during polymerization or of a different solvent. No particular limitation is imposed on the solvent, provided compatibility with the polymer is not lost. Any single solvent or plurality of solvents may be selected and used.

Illustrative examples of such solvents include toluene, p-xylene, o-xylene, m-xylene, ethylbenzene, styrene, ethylene glycol dimethyl ether, propylene glycol monomethyl ether, ethylene glycol monomethyl ether, propylene glycol, propylene glycol monoethyl ether, ethylene glycol monoethyl ether, ethylene glycol monoisopropyl ether, ethylene glycol methyl ether acetate, propylene glycol monomethyl ether acetate, ethylene glycol ethyl ether acetate, diethylene glycol dimethyl ether, propylene glycol monobutyl ether, ethylene glycol monobutyl ether, diethylene glycol diethyl ether, dipropylene glycol monomethyl ether, diethylene glycol monomethyl ether, dipropylene glycol monoethyl ether, diethylene glycol monoethyl ether, triethylene glycol dimethyl ether, diethylene glycol monoethyl ether acetate, diethylene glycol, 1-octanol, ethylene glycol, hexylene glycol, trimethylene glycol, 1-methoxy-2-butanol, cyclohexanol, diacetone alcohol, furfuryl alcohol, tetrahydrofurfuryl alcohol, propylene glycol, benzyl alcohol, 1,3-butanediol, 1,4-butanediol, 2,3-butandiol, γ-butyrolactone, acetone, methyl ethyl ketone, methyl isopropyl ketone, diethyl ketone, methyl isobutyl ketone, methyl n-butyl ketone, cyclohexanone, ethyl acetate, isopropyl acetate, n-propyl acetate, isobutyl acetate, n-butyl acetate, ethyl lactate, methanol, ethanol, isopropanol, tert-butanol, allyl alcohol, n-propanol, 2-methyl-2-butanol, isobutanol, n-butanol, 2-methyl-1-butanol, 1-pentanol, 2-methyl-1-pentanol, 2-ethylhexanol, 1-methoxy-2-propanol, tetrahydrofuran, 1,4-dioxane, N,N-dimethylformamide, N,N-dimethylacetamide (DMAc), N-methylpyrrolidone, 1,3-dimethyl-2-imidazolidinone, dimethylsulfoxide and N-cyclohexyl-2-pyrrolidinone. These may be used singly or two or more may be used in combination.

At this time, the concentration of solids in the film-forming composition is not particularly limited, so long as it is in a range that does not affect the storage stability, and may be suitably set in accordance with the target film thickness. Specifically, from the standpoint of solubility and storage stability, the solids concentration is preferably from 0.1 to 50 wt %, and more preferably from 0.1 to 20 wt %.

Aside from a triazine ring-containing polymer, a crosslinking agent and a solvent, the photocurable film-forming composition of the invention may include also other ingredients, such as leveling agents and surfactants, provided doing so does not interfere with the advantageous effects of the invention.

Illustrative examples of surfactants include the following nonionic surfactants: polyoxyethylene alkyl ethers such as polyoxyethylene lauryl ether, polyoxyethylene stearyl ether, polyoxyethylene cetyl ether and polyoxyethylene oleyl ether; polyoxyethylene alkylaryl ethers such as polyoxyethylene octylphenol ether and polyoxyethylene nonylphenol ether; polyoxyethylene-polyoxypropylene block copolymers; sorbitan fatty acid esters such as sorbitan monolaurate, sorbitan monopalmitate, sorbitan monostearate, sorbitan monooleate, sorbitan trioleate and sorbitan tristearate; and polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate and polyoxyethylene sorbitan tristearate; and additionally include fluorosurfactants such as those available under the trade names Eftop EF301, EF303 and EF352 (from Mitsubishi Materials Electronic Chemicals Co., Ltd. (formerly Jemco Inc.)), Megafac F171, F173, R-08, R-30 F-553, F-554, RS-75 and RS-72-K (DIC Corporation), Fluorad FC430 and FC431 (Sumitomo 3M, Ltd.), AsahiGuard AG710 and Surflon S-382, SC101, SC102, SC103, SC104, SC105 and SC106 (Asahi Glass Co., Ltd.); and also the organosiloxane polymers KP341 (Shin-Etsu Chemical Co., Ltd.) and BYK-302, BYK-307, BYK-322, BYK-323, BYK-330, BYK-333, BYK-370, BYK-375 and BYK-378 (BYK-Chemie Japan KK).

These surfactants may be used singly or two or more may be used in combination. The amount of surfactant used per 100 parts by weight of the triazine ring-containing polymer is preferably from 0.0001 to 5 parts by weight, more preferably from 0.001 to 1 part by weight, and even more preferably from 0.01 to 0.5 part by weight.

The other ingredients mentioned above may be added in any step during preparation of the inventive composition.

The photocurable film-forming composition of the invention can be formed into a desired cured film by being applied onto a base material, then optionally heated to evaporate the solvent and subsequently irradiated with light.

Any suitable method may be used for applying the composition, such as spin coating, dipping, flow coating, inkjet printing, spraying, bar coating, gravure coating, slit coating, roll coating, transfer printing, brush coating, blade coating and air knife coating.

Illustrative examples of the base material include silicon, indium-tin oxide (ITO)-coated glass, indium zinc oxide (IZO)-coated glass, polyethylene terephthalate (PET), plastic, glass, quartz and ceramic. Use can also be made of a flexible base material having pliability.

The temperature at which baking is carried out in order to evaporate the solvent is not subject to any particular limitation. For example, baking may be carried out at between 40 and 400° C.

The baking process is not particularly limited. For example, solvent evaporation may be effected using a hot plate or an oven, and under a suitable atmosphere, such as in open air, in nitrogen or another inert gas, or in a vacuum.

As for the bake temperature and time, conditions which are compatible with the processing steps for the target electronic device should be selected. Bake conditions such that the physical values of the resulting film conform to the required characteristics of the electronic device should be selected.

The light irradiation conditions are not particularly limited. For example, an irradiation energy and time which are suitable for the triazine ring-containing polymer and crosslinking agent that are used may be employed.

Because the cured film of the invention that has been obtained in this way is able to achieve a high heat resistance, high transparency, high refractive index, high solubility and low volume shrinkage, it can be advantageously used as a component in the fabrication of electronic devices such as liquid-crystal displays, organic electroluminescent (EL) displays, optical semiconductor (LED) devices, solid-state image sensors, organic thin-film solar cells, dye-sensitized solar cells and organic thin-film transistors (TFT).

EXAMPLES

The invention is illustrated more fully below by way of Synthesis Examples and Working Examples, although the invention is not limited by these Examples. The instruments used for measurement in the Examples were as follows.
[$^1$H-NMR]
  Instruments: Varian NMR System 400 NB (400 MHz)
    JEOL-ECA700 (700 MHz)
  Solvent used in measurement: DMSO-d6
  Reference material: Tetramethylsilane (TMS) ($\delta$=0.0 ppm)
[GPC]
  Instrument: HLC-8200 GPC (Tosoh Corporation)
  Columns: Shodex KF-804L+KF-805L
  Column temperature: 40° C.
  Solvent: Tetrahydrofuran (THF)
  Detector: UV (254 nm)
  Calibration curve: polystyrene standard
[Ellipsometer]
  Instrument: VASE multiple incident angle spectroscopic ellipsometer (JA Woollam Japan)
[Thermogravimetric/Differential Thermal Analyzer (TG-DTA)]
  Instrument: TG-8120 (Rigaku Corporation)
  Temperature ramp-up rate: 10° C./min
  Measurement temperatures: 25° C. to 750° C.
[1] Synthesis of Triazine Ring-Containing Hyperbranched Polymer Synthesis Example 1

Synthesis of HB-TmDA

[Chemical Formula 16]

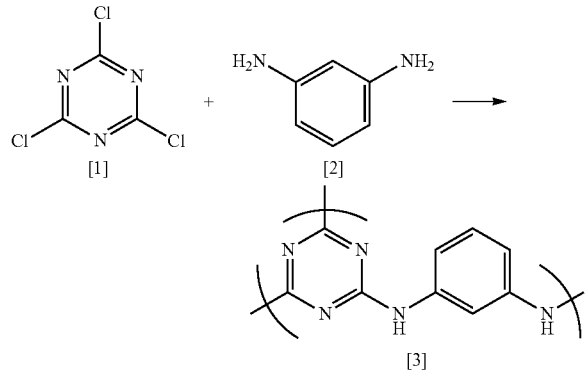

Under a nitrogen atmosphere, 456.02 g of DMAc was added to a 1,000 mL four-neck flask and cooled to −10° C. in an acetone-dry ice bath, following which 84.83 g (0.460 mol) of 2,4,6-trichloro-1,3,5-triazine [1] (Evonik Degussa) was added and dissolved therein. Next, a solution of 62.18 g (0.575 mol) of m-phenylenediamine [2] and 14.57 g (0.156 mol) of aniline dissolved in 304.01 g of DMAc was added dropwise. After dropwise addition, the flask contents were stirred for 30 minutes, then the reaction solution was added dropwise over a period of 1 hour using a fluid transfer pump to a reactor consisting of a 2,000 mL four-neck flask to which had already been added 621.85 g of DMAc and which was heated beforehand to 85° C. on an oil bath. Following addition, stirring was carried out for 1 hour, effecting polymerization.

Next, 113.95 g (1.224 mol) of aniline was added and the flask contents were stirred for 1 hour, bringing the reaction to an end. The system was cooled to room temperature in an ice bath, after which 116.36 g (1.15 mol) of triethylamine was added dropwise and 30 minutes of stirring was carried out, thereby quenching the hydrochloric acid. The hydrochloride that settled out was then removed by filtration. The filtered reaction mixture was reprecipitated in a mixed solution of 28% ammonia water (279.29 g) and 8,820 g of ion-exchanged water. The precipitate was filtered, dried in a vacuum desiccator at 150° C. for 8 hours, then redissolved in 833.1 g of THF and reprecipitated in 6,665 g of ion-exchanged water. The resulting precipitate was filtered, then dried in a vacuum desiccator at 150° C. for 25 hours, yielding 118.0 g of the target polymeric compound [3] (abbreviated below as "HB-TmDA40").

FIG. 1 shows the measured $^1$H-NMR spectrum for HB-TmDA40. The HB-TmDA40 thus obtained is a compound having structural units of formula (1). The polystyrene-equivalent weight-average molecular weight Mw of HB-TmDA40, as measured by GPC, was 4,300, and the polydispersity Mw/Mn was 3.44.

(1) Heat Resistance Test

TG-DTA measurement was carried out on the HB-TmDA40 obtained in Synthesis Example 1, whereupon the 5% weight loss temperature was 419° C. The results are shown in FIG. 2.

(2) Measurement of Refractive Index

The HB-TmDA40 obtained in Synthesis Example 1 (0.5 g) was dissolved in 4.5 g of cyclohexanone, giving a clear, light yellow-colored solution. Using a spin coater, the resulting polymer varnish was spin-coated onto a glass substrate for 5 seconds at 200 rpm and for 30 seconds at 2,000 rpm, following which the solvent was removed by 1 minute of heating at 150° C. and 5 minutes of heating at 250° C., thereby giving a film. The refractive index of the resulting film was measured, whereupon the refractive index at 550 nm was 1.790.

[2] Production of Polyfunctional Epoxy-Type Crosslinking Agent-Containing Photocurable Film-Forming Compositions and Photocured Films Example 1

Without Addition of Initiator

A photocurable film-forming composition (polymer varnish) was prepared by adding together 1 g of the HB-TmDA40 obtained in Synthesis Example 1, 6.93 g of cyclohexanone, 0.07 g of 2-pyrrolidone, 0.1 g of the polyfunctional epoxy-type crosslinking agent Celloxide 2021P (Daicel Chemical Industries, Ltd.), 0.4 g of the polyfunctional epoxy-type crosslinking agent Celloxide 3000 (Daicel Chemical Industries, Ltd.) and 0.25 g of 4-methylhexahydrophthalic anhydride (Tokyo Chemical Industry), and visually confirming that dissolution had occurred.

Example 2

With Addition of Photoacid Generator

A photocurable film-forming composition (polymer varnish) was prepared by adding together 1 g of the HB-TmDA40 obtained in Synthesis Example 1, 6.93 g of cyclohexanone, 0.07 g of 2-pyrrolidone, 0.1 g of Celloxide 2021P (Daicel Chemical Industries, Ltd.), 0.4 g of Celloxide 3000 (Daicel Chemical Industries, Ltd.), 0.25 g of 4-methylhexahydrophthalic anhydride (Tokyo Chemical Industry) and 0.03 g of the photoacid generator CPI-100P (a 50 wt % propylene carbonate solution available from San-Apro Ltd.), and visually confirming that dissolution had occurred.

Example 3

With Addition of Photobase Generator

A photocurable film-forming composition (polymer varnish) was prepared by adding together 1 g of the HB-TmDA40 obtained in Synthesis Example 1, 8 g of cyclohexanone, 0.5 g of Celloxide 2021P (Daicel Chemical Industries, Ltd.), 0.5 g of Celloxide 3000 (Daicel Chemical Industries, Ltd.) and 0.03 g of the photobase generator NBC-101 (Midori Kagaku Co., Ltd.), and visually confirming that dissolution had occurred.

Comparative Example 1

Without Addition of HB-TmDA40

A composition was prepared by adding together 3.96 g of cyclohexanone, 0.1 g of Celloxide 2021P (Daicel Chemical Industries, Ltd.) and 0.4 g of Celloxide 3000 (Daicel Chemical Industries, Ltd.), and visually confirming that dissolution had occurred.

The polymer varnishes obtained in above Examples 1 to 3 and Comparative Example 1 were spin-coated for 5 seconds at 100 rpm and for 30 seconds at 1,000 rpm (Examples 1 to 3) or 500 rpm (Comparative Example 1), then baked at 100° C. for 10 minutes, thereby removing the solvent. Next, light irradiation at 20 mW/cm$^2$ was carried out for 10 minutes, thereby giving cured films.

The resulting cured films were then subjected to measurement of the refractive index, film thickness, and film thickness following 5 minutes of immersion in cyclohexanone (CHN). The results are shown in Table 1.

TABLE 1

| | Refractive index (at 550 nm) | Film thickness (nm) | Film thickness after immersion in CHN (nm) |
|---|---|---|---|
| Example 1 | 1.7178 | 1,007 | 1,012 |
| Example 2 | 1.7250 | 994 | 986 |
| Example 3 | 1.7165 | 843 | 846 |
| Comparative Example 1 | 1.5423 | 61 | 0 |

As shown in Table 1, by combining HB-TmDA40 and a polyfunctional epoxy compound, it was possible to manufacture a cured film, regardless of the presence or absence of an initiator. Moreover, the resulting cured films were confirmed to be high refractive index cured films having a refractive index greater than 1.7.

[3] Production of Polyfunctional (Meth)Acrylate-Type Crosslinking Agent-Containing Photocurable Film-Forming Compositions and Photocured Films Example 4

Crosslinking Agent A-9300, Without Addition of Initiator

A photocurable film-forming composition was prepared by initially preparing a 15 wt % cyclohexanone+ion-exchanged water solution of the HB-TmDA40 obtained in Synthesis Example 1, then adding together 20 g of the solution, 0.21 g of A-9300 (Shin-Nakamura Chemical Co., Ltd.), 0.0015 g of the surfactant Megafac F-554 (DIC Corporation) and 9.98 g of cyclohexanone, and visually confirming that dissolution had occurred.

Example 5

Crosslinking Agent A-9300, with Addition of Initiator

A photocurable film-forming composition was prepared by initially preparing an 8 wt % cyclohexanone+ion-exchanged water solution of the HB-TmDA40 obtained in Synthesis Example 1, then adding together 12.5 g of the solution, 0.07 g of A-9300 (Shin-Nakamura Chemical Co., Ltd.), 0.0021 g of the photoradical initiator Irgacure 907 (BASF) and 0.80 g of cyclohexanone, and visually confirming that dissolution had occurred.

Example 6

Crosslinking Agent U-15HA, Without Addition of Initiator

A photocurable film-forming composition was prepared by initially preparing a 15 wt % cyclohexanone+ion-exchanged water solution of the HB-TmDA40 obtained in Synthesis Example 1, then adding together 20 g of the solution, 0.21 g of U-15HA (Shin-Nakamura Chemical Co., Ltd.), 0.0015 g of the surfactant Megafac F-554 (DIC Corporation) and 1.19 g of cyclohexanone, and visually confirming that dissolution had occurred.

Example 7

Crosslinking Agent A-DCP, Without Addition of Initiator

A photocurable film-forming composition was prepared by initially preparing an 8 wt % cyclohexanone+ion-exchanged water solution of the HB-TmDA40 obtained in Synthesis Example 1, then adding together 12.5 g of the solution, 0.07 g of A-DCP (Shin-Nakamura Chemical Co., Ltd.) and 0.80 g of cyclohexanone, and visually confirming that dissolution had occurred.

Example 8

Crosslinking Agent A-DCP, with Addition of Initiator

A photocurable film-forming composition was prepared by initially preparing an 8 wt % cyclohexanone+ion-exchanged water solution of the HB-TmDA40 obtained in Synthesis Example 1, then adding together 12.5 g of the solution, 0.07 g of A-DCP (Shin-Nakamura Chemical Co., Ltd.), 0.0021 g of the photoradical initiator Irgacure 907 (BASF) and 0.80 g of cyclohexanone, and visually confirming that dissolution had occurred.

Example 9

Crosslinking Agent A-DPH, Without Addition of Initiator

A photocurable film-forming composition was prepared by initially preparing an 8 wt % cyclohexanone+ion-exchanged water solution of the HB-TmDA40 obtained in Synthesis Example 1, then adding together 12.5 g of the solution, 0.07 g of A-DPH (Shin-Nakamura Chemical Co., Ltd.) and 0.80 g of cyclohexanone, and visually confirming that dissolution had occurred.

Example 10

Crosslinking Agent A-DPH, with Addition of Initiator

A photocurable film-forming composition was prepared by initially preparing an 8 wt % cyclohexanone+ion-exchanged water solution of the HB-TmDA40 obtained in Synthesis Example 1, then adding together 12.5 g of the solution, 0.07 g of A-DPH (Shin-Nakamura Chemical Co., Ltd.), 0.0021 g of the photoradical initiator Irgacure 907 (BASF) and 0.80 g of cyclohexanone, and visually confirming that dissolution had occurred.

Comparative Example 2

Crosslinking Agent A-9300, Without Addition of HB-TmDA40

A composition was prepared by adding together 1.5 g of cyclohexanone and 0.5 g of A-9300 (Shin-Nakamura Chemical Co., Ltd.), and visually confirming that dissolution had occurred.

Comparative Example 3

Crosslinking Agent U-15HA, without Addition of HB-TmDA40

A composition was prepared by adding together 1.5 g of cyclohexanone and 0.5 g of U-15HA (Shin-Nakamura Chemical Co., Ltd.), and visually confirming that dissolution had occurred.

The polymer varnishes obtained in Examples 4 and 6 and in Comparative Examples 2 and 3 were spin-coated for 5 seconds at 200 rpm and for 30 seconds at 1,500 rpm, then baked at 130° C. for 3 minutes to remove the solvent. Next, light irradiation at 20 mW/cm$^2$ was carried out for 40 seconds, thereby giving cured films.

The polymer varnishes obtained in Examples 5 and 7 to 10 were spin-coated for 5 seconds at 100 rpm and for 30 seconds at 1,000 rpm, then baked at 100° C. for 5 minutes to remove the solvent. Next, light irradiation at 20 mW/cm$^2$ was carried out for 120 seconds, thereby giving a cured film.

The resulting cured films were then subjected to measurement of the refractive index, film thickness, and film thickness following 5 minutes of immersion in cyclohexanone (CHN). The results are shown in Table 2.

TABLE 2

| | Refractive index (at 550 nm) | Film thickness (nm) | Film thickness after CHN immersion (nm) |
|---|---|---|---|
| Example 4 | 1.7847 | 423 | 424 |
| Example 5 | 1.7825 | 378 | 380 |
| Example 6 | 1.7633 | 1,058 | 1,062 |
| Example 7 | 1.7828 | 384 | 385 |
| Example 8 | 1.7775 | 377 | 373 |
| Example 9 | 1.7820 | 392 | 393 |
| Example 10 | 1.7790 | 382 | 383 |
| Comparative Example 2 | — | tacky | — |
| Comparative Example 3 | — | tacky | — |

As shown in Table 2, by combining the HB-TmDA40 and a polyfunctional acrylic compound, it was possible to produce a cured film, regardless of the presence or absence of an initiator. Moreover, the resulting cured films were confirmed to be high-refractive-index cured films having refractive indices greater than 1.7. In addition, compared with cases in which polyfunctional epoxy-type crosslinking agents were used, it is apparent that the decrease in refractive index from the initial refractive index of 1.790 is suppressed.

By contrast, in the case of the films of Comparative Examples 2 and 3 obtained using only a polyfunctional acrylate compound, measurement of the refractive index and the film thickness was not possible. In these latter films, the film surface had tack but the tack vanished when the film was immersed in CHN. Hence, it is thought that these films did not completely cure.

Example 11

Combined Use of Low-Viscosity Crosslinking Agents

A photocurable film-forming composition was prepared by initially preparing a 20 wt % cyclohexanone/ion-exchanged water (96:4, wt/wt) solution of the HB-TmDA40 obtained in Synthesis Example 1, then adding together 5.0 g of the solution, 0.05 g of U-6HA (Shin-Nakamura Chemical Co., Ltd.), 0.07 g of A-GLY-9E (95 mPa·s, Shin-Nakamura Chemical Co., Ltd.), 0.05 g of the photoradical initiator Irgacure 184 (BASF), 0.0005 g of Megafac F-554 (DIC Corporation) and 2.19 g of cyclohexanone, and visually confirming that dissolution had occurred.

Example 12

Combined Use of Low-Viscosity Crosslinking Agents

A photocurable film-forming composition was prepared by initially preparing a 20 wt % cyclohexanone/ion-exchanged water (96:4, wt/wt) solution of the HB-TmDA40 obtained in Synthesis Example 1, then adding together 5.0 g of the solution, 0.05 g of U-6HA (Shin-Nakamura Chemical Co., Ltd.), 0.07 g of A-GLY-20E (200 mPa·s, Shin-Nakamura Chemical Co., Ltd.), 0.05 g of the photoradical initiator Irgacure 184 (BASF), 0.0005 g of Megafac F-554 (DIC Corporation) and 2.19 g of cyclohexanone, and visually confirming that dissolution had occurred.

Example 13

Combined Use of Low-Viscosity Crosslinking Agents

A photocurable film-forming composition was prepared by initially preparing a 20 wt % cyclohexanone/ion-exchanged water (96:4, wt/wt) solution of the HB-TmDA40 obtained in Synthesis Example 1, then adding together 5.0 g of the solution, 0.03 g of ATM-35E (Shin-Nakamura Chemical Co., Ltd.), 0.1 g of A-GLY-20E (200 mPa·s, Shin-Nakamura Chemical Co., Ltd.), 0.05 g of the photoradical initiator Irgacure 184 (BASF), 0.0005 g of Megafac F-554 (DIC Corporation) and 2.23 g of cyclohexanone, and visually confirming that dissolution had occurred.

The photocurable film-forming compositions (polymer varnishes) obtained in Examples 11 to 13 were spin-coated for 5 seconds at 200 rpm and for 30 seconds at 1,500 rpm, then baked at 130° C. for 3 minutes to remove the solvent. Next, light irradiation at 20 mW/cm$^2$ was carried out for 5 seconds or 10 seconds, thereby giving a cured film.

The resulting cured films were then subjected to measurement of the refractive index, film thickness, and film thickness following 5 minutes of immersion in ethanol and 5-propanol. The results are shown in Table 3.

TABLE 3

| | Exposure time (s) | Refractive index (at 550 nm) | Film thickness (nm) | Film thickness after immersion in ethanol (nm) | Film thickness after immersion in 2-propanol (nm) |
|---|---|---|---|---|---|
| Example 11 | 5 | 1.7689 | 620 | 620 | 624 |
| | 10 | 1.7688 | 612 | 611 | 615 |
| Example 12 | 5 | 1.7679 | 627 | 617 | 623 |
| | 10 | 1.7679 | 620 | 619 | 612 |
| Example 13 | 5 | 1.7692 | 927 | 920 | 927 |
| | 10 | 1.7574 | 939 | 935 | 939 |

Example 14

Single Low-Viscosity Crosslinking Agent

A photocurable film-forming composition was prepared by initially preparing a 20 wt % cyclohexanone/ion-exchanged water (96:4, wt/wt) solution of the HB-TmDA40 obtained in Synthesis Example 1, then adding together 3.5 g of the solution, 0.175 g of ATM-4E (150 mPa·s; Shin-Nakamura Chemical Co., Ltd.), 0.035 g of the photoradical initiator Irgacure 184 (BASF), 0.0004 g of Megafac F-554 (DIC Corporation) and 2.55 g of cyclohexanone, and visually confirming that dissolution had occurred.

Example 15

Single Low-Viscosity Crosslinking Agent

A photocurable film-forming composition was prepared by initially preparing a 20 wt % cyclohexanone/ion-exchanged water (96:4, wt/wt) solution of the HB-TmDA40 obtained in Synthesis Example 1, then adding together 3.5 g of the solution, 0.175 g of ATM-35E (350 mPa·s; Shin-Nakamura Chemical Co., Ltd.), 0.035 g of the photoradical initiator Irgacure 184 (BASF), 0.0004 g of Megafac F-554 (DIC Corporation) and 2.55 g of cyclohexanone, and visually confirming that dissolution had occurred.

Example 16

Single Low-Viscosity Crosslinking Agent

A photocurable film-forming composition was prepared by initially preparing a 20 wt % cyclohexanone/ion-exchanged water (96:4, wt/wt) solution of the HB-TmDA40 obtained in Synthesis Example 1, then adding together 3.5 g of the solution, 0.175 g of A-GLY-9E (95 mPa·s; Shin-Nakamura Chemical Co., Ltd.), 0.035 g of the photoradical initiator Irgacure 184 (BASF), 0.0004 g of Megafac F-554 (DIC Corporation) and 2.55 g of cyclohexanone, and visually confirming that dissolution had occurred.

Example 17

Single Low-Viscosity Crosslinking Agent

A photocurable film-forming composition was prepared by initially preparing a 20 wt % cyclohexanone/ion-exchanged water (96:4, wt/wt) solution of the HB-TmDA40 obtained in Synthesis Example 1, then adding together 3.5 g of the solution, 0.175 g of A-GLY-20E (200 mPa·s; Shin-Nakamura Chemical Co., Ltd.), 0.035 g of the photoradical initiator Irgacure 184 (BASF), 0.0004 g of Megafac F-554 (DIC Corporation) and 2.55 g of cyclohexanone, and visually confirming that dissolution had occurred.

Example 18

Combined Use of Low-Viscosity Crosslinking Agents

A photocurable film-forming composition was prepared by initially preparing a 20 wt % cyclohexanone/ion-exchanged water (96:4, wt/wt) solution of the HB-TmDA40 obtained in Synthesis Example 1, then adding together 5.0 g of the solution, 0.083 g of A-GLY-20E (200 mPa·s; Shin-Nakamura Chemical Co., Ltd.), 0.083 g of ATM-35E (350 mPa·a; Shin-Nakamura Chemical Co., Ltd.), 0.050 g of the photoradical initiator Irgacure 184 (BASF), 0.0005 g of Megafac F-554 (DIC Corporation) and 2.27 g of cyclohexanone, and visually confirming that dissolution had occurred.

Example 19

Combined Use of Low-Viscosity Crosslinking Agents

A photocurable film-forming composition was prepared by initially preparing a 20 wt % cyclohexanone/ion-exchanged water (96:4, wt/wt) solution of the HB-TmDA40 obtained in Synthesis Example 1, then adding together 5.0 g of the solution, 0.10 g of A-GLY-20E (200 mPa·s; Shin-Nakamura Chemical Co., Ltd.), 0.03 g of ATM-35E (350 mPa·a; Shin-Nakamura Chemical Co., Ltd.), 0.050 g of the photoradical initiator Irgacure 184 (BASF), 0.0005 g of Megafac F-554 (DIC Corporation) and 2.39 g of cyclohexanone, and visually confirming that dissolution had occurred.

The photocurable film-forming compositions (polymer varnishes) obtained in Examples 14 to 19 were spin-coated for 5 seconds at 200 rpm and for 30 seconds at 1,500 rpm, then baked at 130° C. for 3 minutes to remove the solvent. Next, light irradiation at 20 mW/cm$^2$ was carried out for 10 seconds, thereby giving a cured film.

The resulting cured films were then subjected to measurement of the refractive index, film thickness, and film thickness following 5 minutes of immersion in ethanol and 5-propanol. The results are shown in Table 4.

TABLE 4

| | Exposure time (s) | Refractive index (at 550 nm) | Film thickness (nm) | Film thickness after immersion in ethanol (nm) | Film thickness after immersion in 2-propanol (nm) |
|---|---|---|---|---|---|
| Example 14 | 10 | 1.7723 | 383 | 376 | 371 |
| Example 15 | 10 | 1.7661 | 379 | 371 | 368 |
| Example 16 | 10 | 1.7674 | 356 | 348 | 347 |
| Example 17 | 10 | 1.7473 | 359 | 346 | 347 |
| Example 18 | 10 | 1.7748 | 923 | 924 | 922 |
| Example 19 | 10 | 1.7748 | 875 | 877 | 871 |

As shown in Tables 3 and 4, it is apparent that, by using a polyfunctional acrylic compound having a low viscosity and a long chain between the acrylic ends, either alone, in a combination of two or more thereof, or in combination with a polyfunctional acrylic compound having an isocyanuric acid skeleton, cured films can be produced with a short period of exposure to light.

Moreover, such cured films are thin films of excellent solvent resistance in which cracks do not arise even after immersion in alcohol.

The invention claimed is:
1. A method of manufacturing a cured film, the method being comprised of irradiating with light and thereby curing a photocurable film-forming composition comprising a triazine-ring-containing polymer which includes a recurring unit structure of formula (1) below

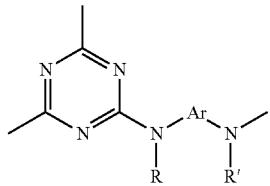
(1)

wherein R and R' are each independently a hydrogen atom, an alkyl group, an alkoxy group, an aryl group or an aralkyl group; and Ar is at least one moiety selected from the group consisting of moieties of formulas (2) to (13) below

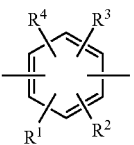
(2)

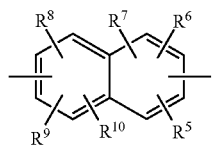
(3)

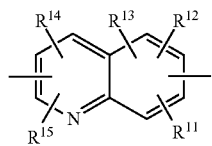
(4)

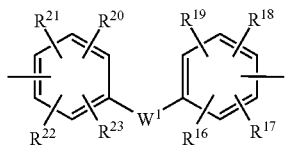
(5)

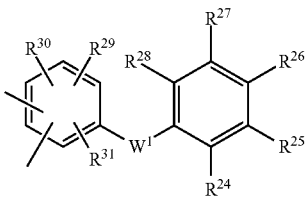
(6)

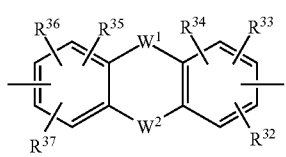
(7)

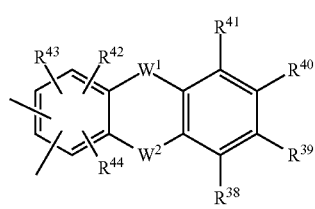
(8)

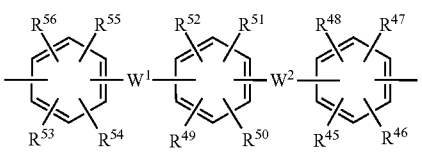
(9)

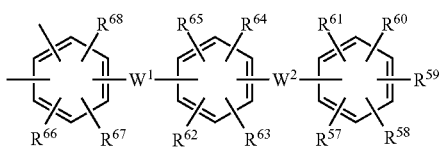
(10)

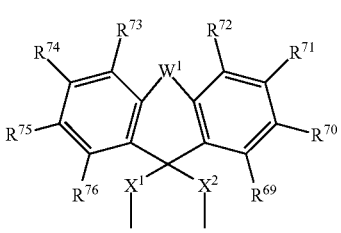
(11)

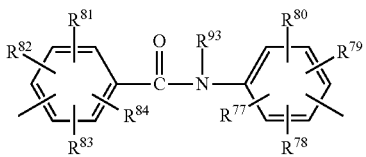
(12)

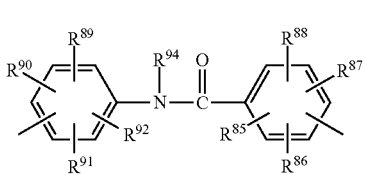
(13)

in which $R^1$ to $R^{92}$ are each independently a hydrogen atom, a halogen atom, a carboxyl group, a sulfonyl group, an alkyl group which may have a branched structure of 1 to 10 carbons, or an alkoxy group which may have a branched structure of 1 to 10 carbons; $R^{93}$ and $R^{94}$ are hydrogen atoms or alkyl groups which may have a branched structure of 1 to 10 carbons; $W^1$ and $W^2$ are each independently a single bond, $CR^{95}R^{96}$, $R^{95}$ and $R^{96}$ being each independently a hydrogen atom or an alkyl group which may have a branched structure of 1 to 10 carbons, with the proviso that $R^{95}$ and $R^{96}$ may together form a ring, C=O, O, S, SO, $SO_2$ or $NR^{97}$, $R^{97}$ being a hydrogen atom or an alkyl group which may have a branched structure of 1 to 10 carbons; and $X^1$ and $X^2$ are each independently a single bond, an alkylene group which may have a branched structure of 1 to 10 carbons, or a group of formula (14) below

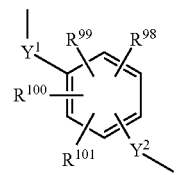
(14)

$R^{98}$ to $R^{101}$ being each independently a hydrogen atom, a halogen atom, a carboxyl group, a sulfonyl group, an alkyl group which may have a branched structure of 1 to 10 carbons, or an alkoxy group which may have a branched structure of 1 to 10 carbons; and $Y^1$ and $Y^2$ being each independently a single bond or an alkylene group which may have a branched structure of 1 to 10 carbons, and a crosslinking agent, wherein the crosslinking agent is a polyfunctional (meth)acrylate compound, wherein the polyfunctional (meth)acrylate compound comprises a polyfunctional (meth)acrylate compound having an isocyanuric acid skeleton, wherein the photocurable film-forming composition does not include any initiators and can be cured without using an initiator.

2. The method according to claim 1, wherein the polyfunctional (meth)acrylate compound is a combination of a compound having an isocyanuric acid skeleton and a compound which at 25° C. is a liquid and has a viscosity of 5,000 mPa·s or less.

3. The method according to claim 1, wherein the polyfunctional (meth)acrylate compound is a compound which at 25° C. is a liquid and has a viscosity of 5,000 mPa·s or less.

4. The method according to claim 1 or 2, wherein the compound having an isocyanuric acid skeleton is tris[2-(acryloyloxy)ethyl] isocyanurate.

5. The method according to claim 1, wherein the photocurable film-forming composition includes from 1 to 25 parts by weight of the crosslinking agent per 100 parts by weight of the triazine ring-containing polymer.

6. A cured film obtained by the method of manufacturing a cured film according to claim 1.

7. An electronic device comprising a base material and the cured film of claim 6 formed on the base material.

* * * * *